(12) United States Patent
Norton et al.

(10) Patent No.: US 12,527,499 B2
(45) Date of Patent: Jan. 20, 2026

(54) PORTABLE ANALYTE TESTING SYSTEM

(71) Applicant: Adele Health, Inc., Nashville, TN (US)

(72) Inventors: Mark Norton, Nashville, TN (US); Gregory Tyler Boyd, Braselton, GA (US)

(73) Assignee: Adele Health, Inc., Nashville, TN (US)

( * ) Notice: Subject to any disclaimer, the term of this patent is extended or adjusted under 35 U.S.C. 154(b) by 0 days.

(21) Appl. No.: 18/864,490

(22) PCT Filed: Aug. 1, 2023

(86) PCT No.: PCT/US2023/029217
§ 371 (c)(1),
(2) Date: Nov. 8, 2024

(87) PCT Pub. No.: WO2024/030431
PCT Pub. Date: Feb. 8, 2024

(65) Prior Publication Data
US 2025/0169720 A1 May 29, 2025

Related U.S. Application Data

(60) Provisional application No. 63/394,416, filed on Aug. 2, 2022.

(51) Int. Cl.
*A61B 5/145* (2006.01)
*A61B 5/00* (2006.01)
*A61B 5/157* (2006.01)

(52) U.S. Cl.
CPC ...... *A61B 5/14532* (2013.01); *A61B 5/14546* (2013.01); *A61B 5/157* (2013.01);
(Continued)

(58) Field of Classification Search
CPC . A61B 5/14532; A61B 5/14546; A61B 5/157; A61B 5/6898; A61B 5/7475;
(Continued)

(56) References Cited

U.S. PATENT DOCUMENTS

| 7,150,755 B2 | 12/2006 | Levaughn et al. |
| 7,566,419 B2 | 7/2009 | Schulat et al. |

(Continued)

FOREIGN PATENT DOCUMENTS

| GB | 6343542 | 12/2024 |
| GB | 6343543 | 12/2024 |

(Continued)

OTHER PUBLICATIONS

U.S. Appl. No. 63/394,416, filed Aug. 2, 2022. First named inventor: Norton.
(Continued)

*Primary Examiner* — John McGuirk
(74) *Attorney, Agent, or Firm* — Santangelo Law Offices, P.C.

(57) ABSTRACT

A biological test system has receptacles for a variety of removable electro-mechanical biological blood test-based elements having multiple features such as lancets or strips. Testing is through an analysis biological test processor that provides results to a user test output with all designed to be contained in a pocket-transportable user biological test form factor that houses all elements. Biological test elements can be interchanged for multiple sensing modalities with automatic activation based on cartridge insertion of a glucose test element, an A1C test element, a ketone test element, or the like. Designs can include a user sampler configuration selector for a user sampling selection that may be analyzed so a user-personalizable, biological sampler control processor can automatically disable operation for test safety if a user sampling selection is determined to be unacceptable. The system can also provide a user cartridge action prompt, a user reselection prompt, or other action to clear the disable.

28 Claims, 21 Drawing Sheets

(52) U.S. Cl.
CPC .......... *A61B 5/6898* (2013.01); *A61B 5/7475* (2013.01); *A61B 2560/0431* (2013.01); *A61B 2560/0443* (2013.01); *A61B 2560/0462* (2013.01)

(58) Field of Classification Search
CPC .... A61B 2560/0431; A61B 2560/0443; A61B 2560/0462; A61B 5/15; A61B 5/151; A61B 17/34; G01N 33/487; G01N 33/49
See application file for complete search history.

(56) References Cited

U.S. PATENT DOCUMENTS

| | | | |
|---|---|---|---|
| 7,811,236 | B2 | 10/2010 | List et al. |
| 7,833,172 | B2 | 11/2010 | Hein et al. |
| 7,883,473 | B2 | 2/2011 | LeVaughn et al. |
| 8,231,645 | B2 | 7/2012 | List |
| 8,262,614 | B2 | 9/2012 | Freeman et al. |
| 8,435,447 | B2 | 5/2013 | Bryer et al. |
| 8,556,827 | B2 | 10/2013 | Mace |
| 8,636,675 | B2 | 1/2014 | Hein et al. |
| 8,696,597 | B2 | 4/2014 | Neel et al. |
| 8,718,952 | B2 | 5/2014 | Matievich, Jr. et al. |
| 8,870,903 | B2 | 10/2014 | Levaughn et al. |
| 8,961,431 | B2 | 2/2015 | Roe et al. |
| 8,965,476 | B2 | 2/2015 | Freeman et al. |
| 9,186,097 | B2 | 11/2015 | Frey et al. |
| 9,226,699 | B2 | 1/2016 | Freeman et al. |
| 9,339,612 | B2 | 5/2016 | Freeman et al. |
| 9,402,956 | B2 | 8/2016 | Mears et al. |
| 9,439,591 | B2 | 9/2016 | Frey et al. |
| 9,645,105 | B2 | 5/2017 | Simmons et al. |
| 9,647,289 | B1 | 5/2017 | Dighton et al. |
| 9,775,553 | B2 | 10/2017 | Freeman et al. |
| 9,795,747 | B2 | 10/2017 | Castle et al. |
| 9,820,684 | B2 | 11/2017 | Freeman et al. |
| 10,034,628 | B2 | 7/2018 | Freeman et al. |
| 10,241,034 | B2 | 3/2019 | Sugawa et al. |
| 10,324,028 | B2 | 6/2019 | Sugawa et al. |
| 10,973,444 | B1* | 4/2021 | Michaels ........... A61B 5/14532 |
| 11,125,738 | B2 | 9/2021 | Glazier et al. |
| 11,668,707 | B2 | 6/2023 | Brunelle |
| 2006/0241666 | A1 | 10/2006 | Briggs et al. |
| 2007/0088377 | A1 | 4/2007 | LeVaughn et al. |
| 2011/0097808 | A1 | 4/2011 | Rush et al. |
| 2011/0282173 | A1 | 11/2011 | Fonduca et al. |
| 2012/0100601 | A1* | 4/2012 | Simmons ........... G01N 27/3272 435/287.7 |
| 2012/0283539 | A1 | 11/2012 | Freeman et al. |
| 2013/0171675 | A1 | 7/2013 | Tsukamoto et al. |
| 2014/0364711 | A1 | 12/2014 | Ismail et al. |
| 2017/0000349 | A1 | 1/2017 | Krief et al. |
| 2017/0045468 | A1 | 2/2017 | Simmons et al. |
| 2017/0254743 | A1 | 9/2017 | Sugawa et al. |
| 2017/0254746 | A1 | 9/2017 | Sugawa et al. |
| 2020/0080994 | A1 | 3/2020 | Brunelle |
| 2020/0141920 | A1 | 5/2020 | Glazier et al. |
| 2021/0330228 | A1 | 10/2021 | Olsen et al. |
| 2021/0392242 | A1* | 12/2021 | Chang .............. G01N 35/00732 |

FOREIGN PATENT DOCUMENTS

| | | |
|---|---|---|
| GB | 6343544 | 12/2024 |
| GB | 6343545 | 12/2024 |
| WO | 2024030431 A1 | 2/2024 |

OTHER PUBLICATIONS

International Patent Application No. PCT/US23/29217, filed Aug. 1, 2023. First named inventor: Norton.
International Patent Application No. PCT/US23/29217, filed Aug. 1, 2023. First named inventor: Norton. International Search Report and Written Opinion dated Nov. 8, 2023, 15 pages.
International Patent Application No. PCT/US23/29217, filed Aug. 1, 2023. First named inventor: Norton. International Preliminary Report on Patentability dated Sep. 10, 2024, 40 pages.
MedicalNewsToday, Lancets: 5 to consider in 2023. https://www.medicalnewstoday.com/articles/best-lancets#top-lancets. Retrieved Apr. 24, 2023. 25 pages. © 2023 Healthline Media UK Ltd.
Design U.S. Appl. No. 29/926,725, filed Jan. 1, 2024. First named inventor: Norton.
Counterpart Mexican Design Application No. MX/f/2025/000686 filed Feb. 28, 2025, First named inventor: Mark Norton. Notice of Registration dated Oct. 1, 2025, 11 pages.
Counterpart Mexican Design Application No. MX/f/2025/002100 filed Jun. 19, 2025; First named inventor: Mark Norton. Notice of Registration dated Oct. 16, 2025, 10 pages.
Counterpart Canadian Design Application No. 242530 filed Jul. 24, 2025, First named inventor: Mark Norton. Examination Report dated Aug. 21, 2025, 1 page.
Counterpart Canadian Design Application No. 227880 filed Jan. 31, 2024, First named inventor: Mark Norton. .Notice of Registration dated Aug. 21, 2025, 19 pages.
Counterpart Canadian Design Application No. 239370 filed.Apr. 10, 2025, First named inventor: Mark Norton. Notice of Registration dated Aug. 21, 2025,11 pages.
Counterpart: U.S. Appl. No. 29/926,725 filed: Jan. 31, 2024, First named inventor; Mark Norton. Notice of Allowance dated Aug. 26, 2025,8 pages,.
United Kingdom Design Application Nos. 6343542-6343545 filed Jan. 31, 2024. Applicant: Adele Health, Inc. Certificates of Registration dated Dec. 31, 2024, 20 pages.

* cited by examiner

PORTABLE ANALYTE TESTING SYSTEM

This application is a United States National Phase of International PCT Patent Application No. PCT/US23/29217, filed Aug. 1, 2023, which claims priority to and the benefit of U.S. Provisional Patent Application No. 63/394,416 filed Aug. 2, 2022, both applications are hereby incorporated herein by reference in their entirety.

TECHNICAL FIELD

This patent relates to designs, systems, and methods for analyte testing systems such as to assist in diagnostic testing. This patent improves upon such systems especially as they relate to self-administered blood testing. It has particular applicability to systems for conducting tests such as are useful to persons with diabetic conditions and prediabetic conditions where repetitive self-testing compliance is desired, where user convenience, user willingness, transportability with the user, and even social factors can be significant to the desired outcomes and desired repetitive activities. It is often explained in these contexts although it can, of course, be applied more broadly.

BACKGROUND

More than 34 million Americans suffer from diabetes and more than 1 in 3 American adults have prediabetes. In the diabetic state, the victim can suffer from high blood sugar (hyperglycemia) or low blood sugar (hypoglycemia). Left untreated, either condition can lead to serious health issues. Thus, it is critically important for diabetics and prediabetics to measure and monitor their blood glucose levels to avoid prolonged periods of hyper- or hypo-glycemia. The most common method for a diabetic to measure their blood glucose level is through the use of a self-monitoring blood glucose monitor ("SMBG"). SMBGs allow the diabetic to measure their blood glucose level at home or on-the-go, and typically require the interaction of four separate products: (1) a lancing device to generate a blood sample; (2) individual lancets designed to work in the lancing device (3) a test strip containing an enzyme that reacts to a blood sample; and (4) an electronic meter capable of measuring the electric potential between the blood sample and the enzyme on the test strip and then displaying that result to the diabetic.

To run a blood glucose test, the diabetic often places a new lancet in the lancing device, generates a blood sample (often by an imprecise spring-based mechanism), places a new test strip in the electronic meter, and then places a blood sample on the test strip before receiving a value. The diabetic usually then discards the used needle and strip and routinely sterilizes the lancing device and the electronic meter. This process consists of fundamentally separate products merely designed to interact with another and the diabetic is responsible for managing each individual element in the overall process.

More than their blood glucose level, many diabetics may also run a hemoglobin HbA1c test ("A1C"), which measures their average blood sugar level over an extended duration, a ketone blood test, which measures the amount of ketones in the blood, and cholesterol tests. Each test can be important for managing the diabetic condition. The A1C test is commonly used to diagnose prediabetes and diabetes, and is one of the main tests to help the diabetic determine how effectively they are managing their condition. The ketone blood test allows the diabetic to monitor whether they have too many ketones in their blood which can lead to ketoacidosis, a medical emergency. A cholesterol test can help diabetics assess cardiovascular risk, guide treatment decisions, and help prevent complications associated with diabetes. Like SMBGs, A1C, ketone, and cholesterol tests can be performed by the diabetic at home or on-the-go through the use of a lancing device, lancets, a specialized test strip or otherwise, an electronic meter, and usually by following the multi-step process described above.

Thus, to run these important tests without visiting a doctor, the diabetic can be responsible to manage and care for separate electronic meters, separate test strips, a lancing device, and the individual lancets needed to generate a blood sample. For these types of tests and many others, the lack of convenience, portability and integration of multiple tests into a single device often means that diabetics and other subjects do not run tests on-the-go, leading to less frequent testing, which in turn can lead to more frequent health complications.

Innovations to the existing market typically focus on one of two things. First, products may introduce new methods to transport the electronic meter, lancing device, lancets, and test strips more conveniently (often through the use of custom cases or containers). However, the underlying test process still consists of fundamentally independent products simply designed to be carried in close proximity to one another. The diabetic usually still uses the lancing device, the individual lancets, the strips and the electronic meters as described above.

Second, many innovations to the existing market come through the development and implementation of continuous glucose monitoring systems ("CGMs"). CGMs are far more expensive than SMBGs, typically require the user to wear and replace a disposable sensor on their body, and do not test for A1C, ketones, or cholesterol.

In these regards, some of the prior innovations include items that seem impractical and perhaps inconvenient to users. For example, US Patent Publication US20130171675 provides a measuring device and measuring method that does not provide the capabilities, integrated transportability, and user conveniences that the present technology now provides. Similarly, while U.S. Pat. No. 8,435,447 provides an integrated meter for analyzing biological samples, it does not provide the advantages of the present technology, the level of integrated transportability, and combinations of user features that meet the compliance and useability desired and needed for users. U.S. Pat. No. 9,775,553 illustrates how some have narrowly focused efforts such as for particular components or aspects of a testing procedure. Through its extensive citation list, it also reveals the depth of efforts and designs that have existed in its sample testing area. Similarly, while US Patent Publication US20210330228 shows some realization that combining a number of features can be advantageous for users, and presents a more usable form factor, it does not achieve a goal of providing a fully integrated design to the degree of the present technology. Even commercially available designs do not meet this technology's combinations of features and capabilities to the degree necessary to provide the results and user compliance desired.

The availability of portable diagnostic testing not only benefits individuals managing diabetes but also extends to a wide range of health conditions. People with conditions like hypertension, cardiovascular disease, respiratory disorders, and even individuals striving for general well-being can benefit from the convenience and accuracy offered by portable diagnostic tests. Regular monitoring of health parameters enables individuals to take proactive steps towards managing their conditions, maintaining optimal health, and preventing potential complications.

SUMMARY OF INVENTION

The embodiments described herein combine many of the elements needed to perform multiple analyte tests into a single, highly portable, customizable electronic device and, in some embodiments, offer user advantages that can make the entire test process easier and more likely to be regularly conducted-no matter what test is being conducted.

These and other objects and advantages of this technology will become apparent from the following detailed description of the preferred embodiments. Both the foregoing general description and the following detailed description are exemplary and explanatory only and are intended to provide further explanation of the various ways this technology ca be configured and used.

The accompanying drawings are included to provide a further understanding of the technology and are incorporated in and constitute part of this specification, as well as illustrate several embodiments of the invention that together with the description serve to explain the principles of the various embodiments.

DESCRIPTION OF THE PREFERRED EMBODIMENTS

It should be understood that embodiments include a variety of aspects, which may be combined in different ways. The following descriptions are provided to illustrate elements and describe some of the embodiments of the application. These elements are listed with initial embodiments; however, it should be understood that they may be combined in any manner and in any number to create additional embodiments. The variously described examples and preferred embodiments should not be construed to limit the embodiments of the application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the technology will be described more fully hereinafter with reference to the accompanying drawings, in which embodiments of the technology are shown. The technology may, however, be embodied in many different forms and should not be construed as limited to the embodiments set forth herein; rather, the presented embodiments should be understood as illustrative only, other embodiments can exist and would also fall within the scope of this technology as those skilled in the art should readily understand.

In the following description, numerous specific details are set forth. However, it is to be understood that embodiments of the technology may be practiced without these specific details. In other instances, well-known methods, structures, and techniques have been included in order to provide an understanding of this description.

Figure 1:
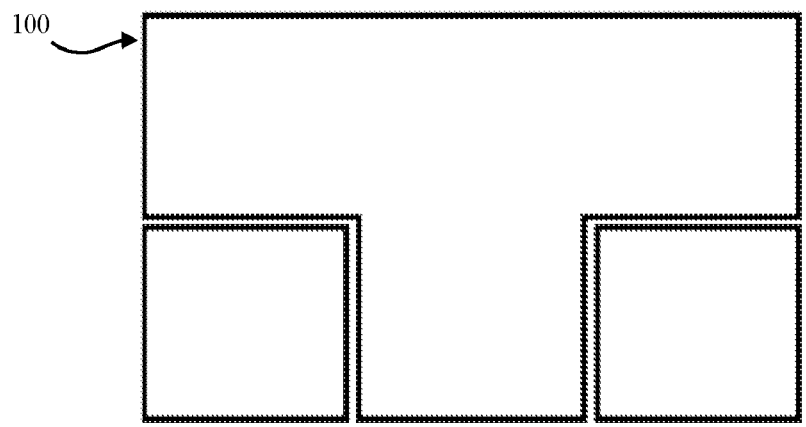
FIG. 1 illustrates an embodiment of the user-friendly personal biological test system.
Figure 2:
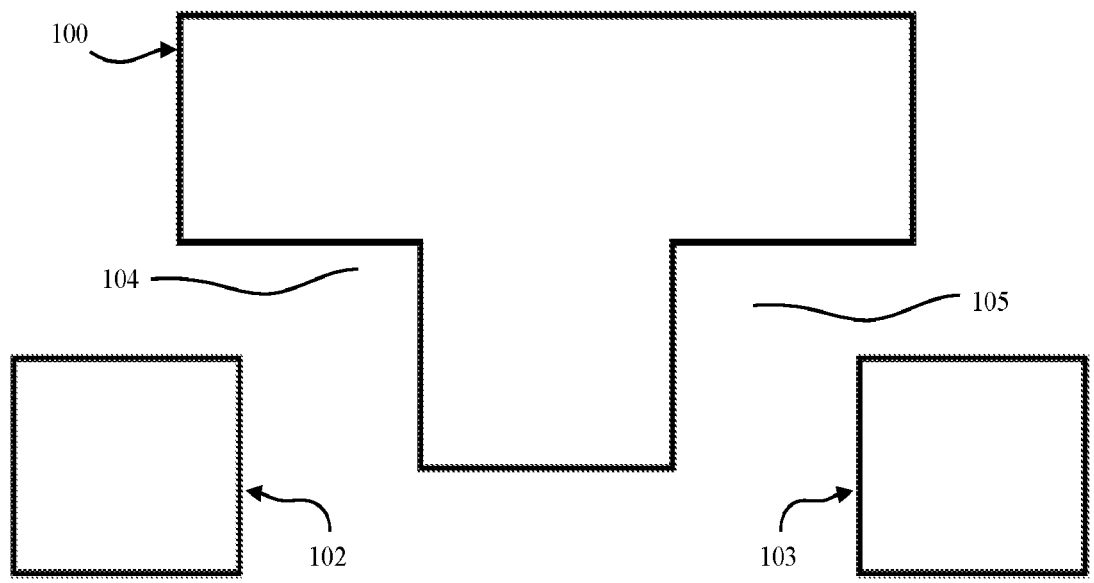
FIG. 2 illustrates an embodiment such as may be understood as having the single, multiple differential biological test receptacle, the single biological sampler receptacle, the removable biological test element, and the biological sampler element, among other features and elements.
Figure 3:
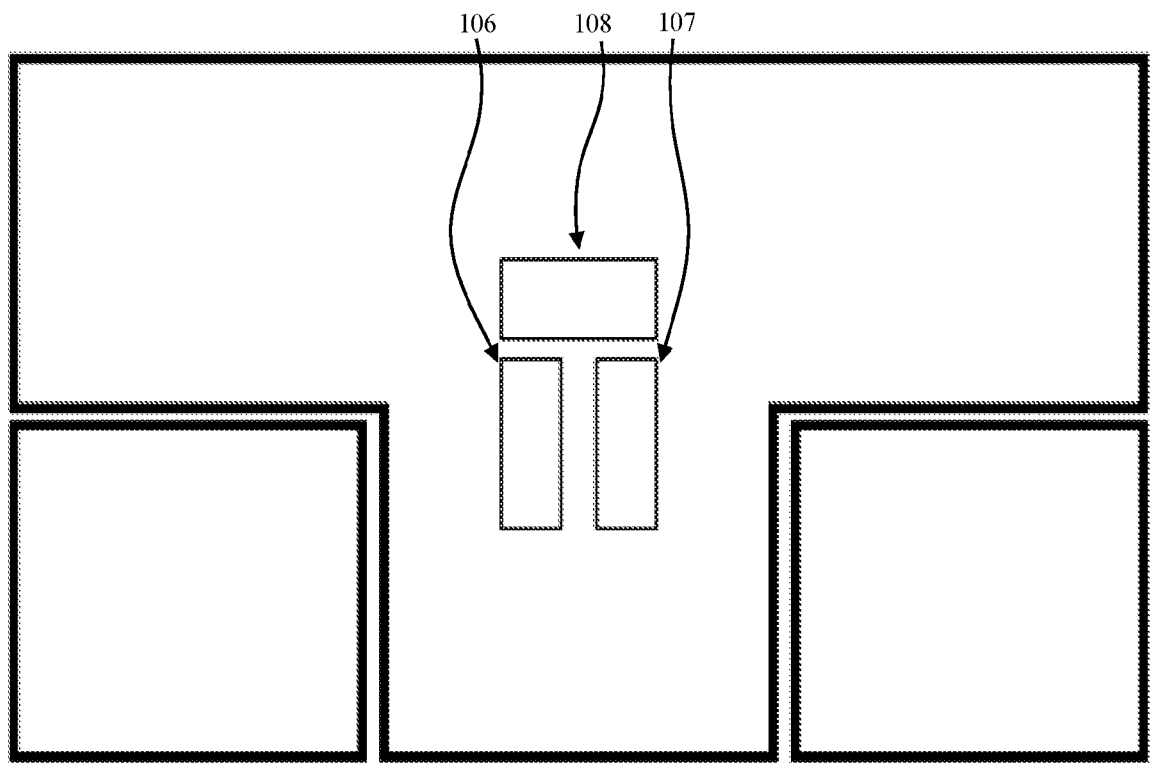
FIG. 3 illustrates an embodiment such as with a first sense modality element, a second sense modality element, and an automatically reconfigurable, substantially instantaneous analysis, multi-differential biological test processor.
Figure 4:
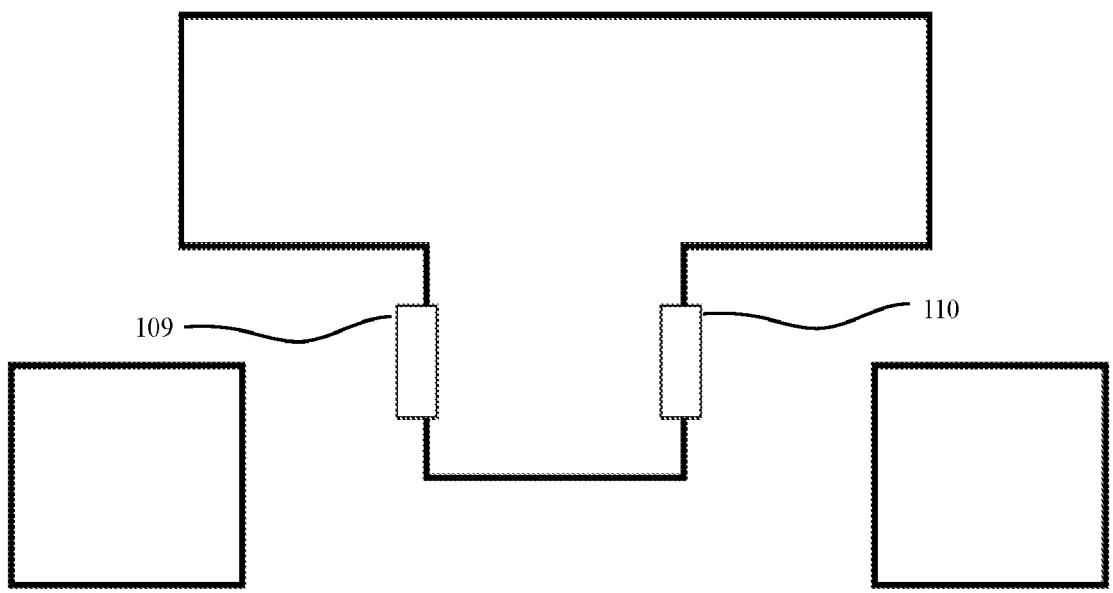
FIG. 4 illustrates an embodiment such as with a biological test element information sensor, and the biological sample element information sensor.
Figure 5:
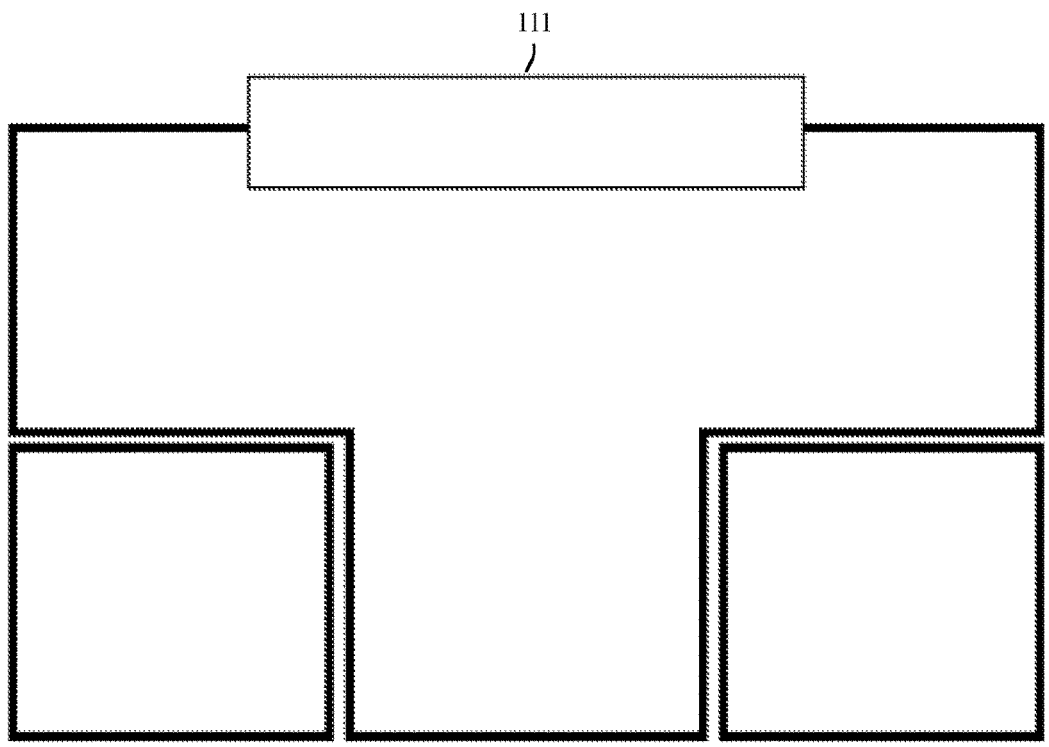
FIG. 5 illustrates an embodiment including a user test output.
Figure 6:
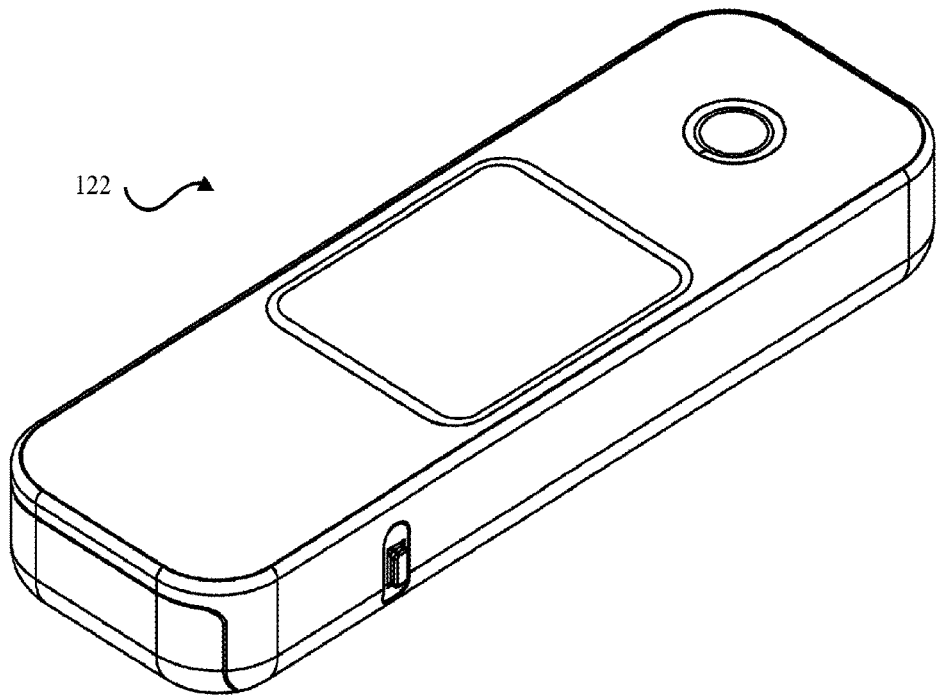
FIG. 6 illustrates an embodiment with a fully contained, pocket-transportable, user biological test form factor.
Figure 7:
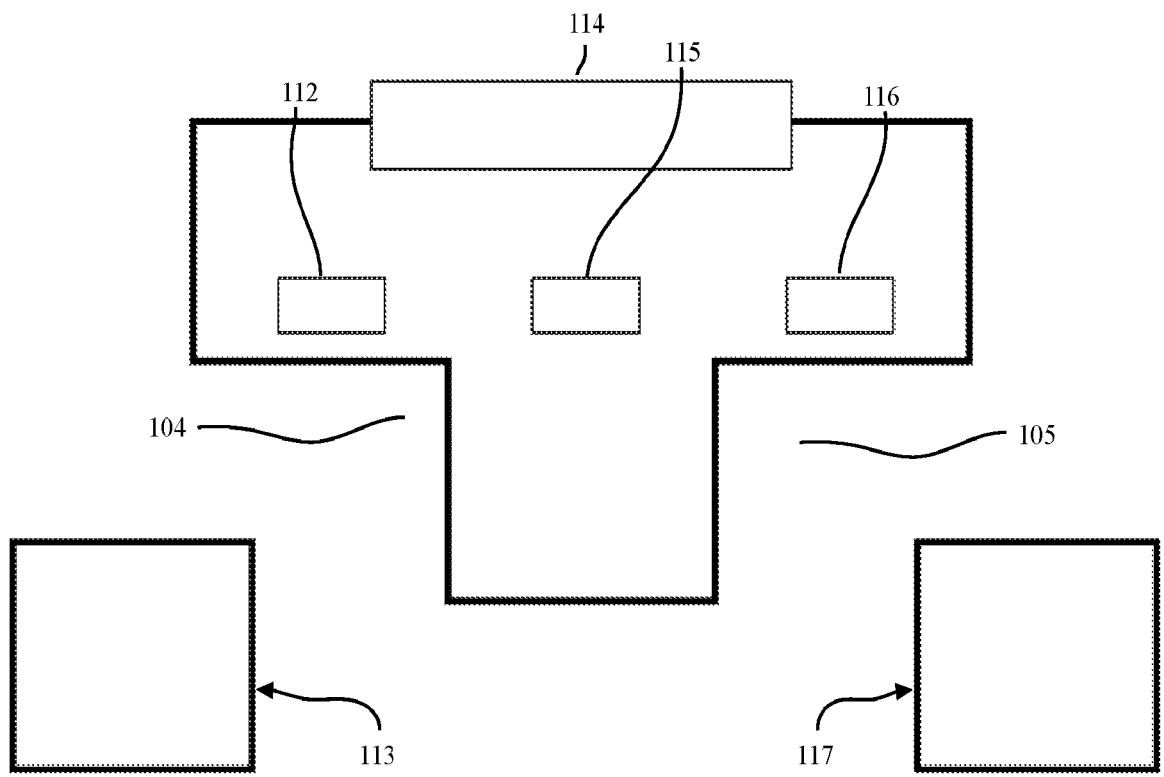
FIG. 7 conceptually illustrates an embodiment of a device showing a substantially instantaneous analysis biological test processor, a form factor contained, electro-operable biological test element detached from the device, a sampler selection efficacy analyzer included within the device, and the form factor contained, electro-mechanically controlled biological sampler also detached from the device.
Figure 8:
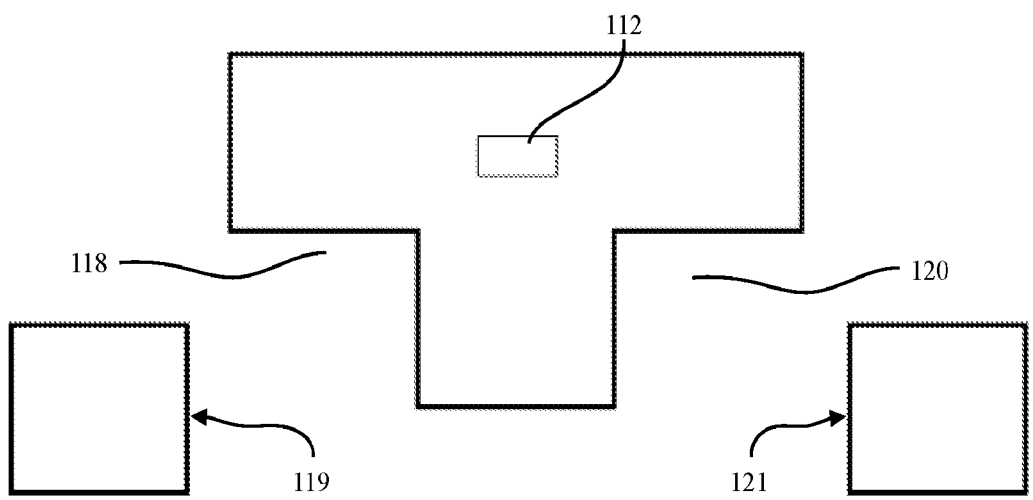
FIG. 8 illustrates an embodiment with a first biological action receptacle, a first removable, form factor contained, electro-mechanical biological user element detached from the device, a second biological action receptacle, and a second removable, form factor contained, electro-mechanical biological user element also detached from the device.

Sequencing through the figures starting at FIG. 1, it can be seen how embodiments are directed at a user-friendly personal biological test system 100. A user-friendly personal biological test system 100 may contain a location at which can be placed some type of biological test element and this can present a single, multiple differential biological test receptacle 104. Further, in embodiments there can be a device having a biological test element information sensor 109 that can act to receive or discern any type of information relative to or also from a biological test element. For example, in one embodiment, a biological test element information sensor 109 may recognize the presence of a cartridge, test element, or some other item. In some embodiments, a biological test element information sensor 109 may be, may contain, or may react to a memory capability or element, a sensing capability or element, a capability or element for communicating, another device interfacing capability or element, a computational capability or element, an information capability or element, an intelligence capability or element (including but not limited to artificial intelligence), and an adaptive capability or element, or a result producing capability or element. In some embodiments, a biological test element information sensor 109 may act to trigger, enable, or disable a device on-board activable software subroutine which may include performing a biological test, running lancing safety steps, triggering a test safety sequence, or some other programmable process. In some embodiments, the single, multiple differential biological test receptacle 104 may be a biological element presence sensor such as anything that is capable of recognizing the presence of a biological test element, a biological element related to some type of test activity or otherwise. A biological element presence sensor may even be a device-contained different sense modality need subroutine, such as any programming from which a decision can be made, such as a decision to change sense modalities or the like. More simply, such an information sensor can be a biological element presence sensor which may react to or be an on-board software routine configured to sense the presence of some removable biological element.

In embodiments, the single, multiple differential biological test receptacle 104 may be configured to mate, and in others to communicate with at least one removable biological test element 102. A removable biological test element 102 may be a type of a removable biological blood procedure element. For example, it may be a removable glucose test element, a removable A1C test element, a removable ketone test element, a removable cholesterol test element, or otherwise. As can be appreciated from these types of tests, a removable biological test element 102 may be a blood test-based element. It may even be a pocket-transportable form factor-creating biological blood test-based cartridge, in the sense that the removable element can, likely but perhaps not only, when placed in an appropriate receptacle, act such as by its exposed exterior surfaces, to create the particular form factor or exterior shape desired. In similar fashion, a pocket-transportable form factor-creating biological blood test-based cartridge may be a user interchangeable, pocket-transportable form factor creating, biological blood test-based cartridge such as an element that a user themselves can interchange and thus effect either having more testing available, changing a type of test, or otherwise. In this way, embodiments can present a biological blood test-based cartridge that may be configured as a user interchangeable biological blood test-based cartridge. And when having multiple common test features, such a biological blood test-based cartridge may present a user interchangeable multiple common test features cartridge. By presenting a contained function that plugs in and out, a user interchangeable, pocket-transportable form factor creating, biological blood test-based cartridge may present as a test cartridge 123. When facilitating multiple test activities that differ, such as in their mode of testing, multiple biological blood test-based cartridges may present a plurality of different biological test cartridges. And each may be capable of creating a substantially similar pocket-transportable form factor by having appropriate, likely similar exposed exterior surfaces.

In some embodiments, a biological blood test-based cartridge may comprise multiple common event features such as strips or otherwise contained within a user interchangeable, pocket-transportable form factor creating, biological blood test-based cartridge. Further, such multiple common event features may be multiple, automatically sequenced, common event features such as the same types of strips, or the like. These may even be configured to be sequenced, perhaps automatically, within a user interchangeable, pocket-transportable form factor creating, biological blood test-based cartridge. In yet another embodiment, such multiple, perhaps automatically sequenced, common event features may be designed as a readably, electro-mechanically sequenced, stack of common event features within a user interchangeable, pocket-transportable form factor creating, biological blood test-based cartridge. This can present a user interchangeable multiple common test features cartridge that may be an electro-mechanically sequenced biological blood test-based cartridge. In some configurations multiple automatically sequenced common event features may present an electro-mechanically sequenced stack of common event features within said an interchangeable, pocket-transportable form factor creating, biological blood test-based cartridge.

Some embodiments may present a blood test-based element, such as any component of or for a blood test-based device that may be a smart biological blood test-based element. In this fashion, the element can include any number of functions as listed below that make that individual component "smart" as commonly understood; again, examples of these functions and capabilities are listed below. In one embodiment, a smart biological blood test-based element may be a biological blood test information containing biological blood test-based element and a smart biological blood test-based element may present a pocket-transportable device, continuous pocket shaped exterior form factor creating, biological blood test-based cartridge. Making the aspect of being considered "smart" particularly advantageous is that an electro-mechanically sequenced biological blood test-based cartridge or other type of cartridge may be part of a plurality of automatic differential test setting user interchangeable biological blood test-based cartridges. In this regard, different types of cartridges can be plugged in and by being plugged in, and "smart" in a very broad sense, they can act to cause the device to automatically change its test setting as appropriate. In one embodiment, the smart biological blood test-based element may include or be at least one of: (1) a self-monitoring capable biological blood test-based element; (2) an analysis capable biological blood test-based element; (3) a reporting capable biological blood test-based element; (4) a memory capable biological blood test-based element; (5) a sensing capable biological blood test-based element; (6) a communication capable biological blood test-based element; (7) another device interfacing capable biological blood test-based element; (8) a computation capable biological blood test-based element; (9) an information capable biological blood test-based element; (10) an intelligence capable biological blood test-based element; (11) an artificial intelligence capable biological blood test-based element, and (12) an adaptive capable biological blood test-based element among others that are understood as smart features or elements. Of course, different types of tests can be accommodated.

In one embodiment, the removable biological test element 102 may comprise an electrochemical test strip. It may also be configured for some other biological test indicator including but not limited to saliva, sweat, urine, or hair based on indicators or tests. In one embodiment, the single, multiple differential biological test receptacle 104 may be a combined glucose test-capable test receptacle and A1C test-capable biological test receptacle so both tests can be accommodated through different cartridges or the like being placed in the same receptacle when a user desires. In one embodiment, the single, multiple differential biological test receptacle 104 may comprise a combined glucose test-capable test receptacle, A1C test-capable biological test receptacle, and ketone test-capable biological test receptacle as well in similar fashion. In one embodiment, the single, multiple differential biological test receptacle 104 may comprise a combined glucose test-capable test receptacle, A1C test-capable biological test receptacle, ketone test-capable biological test receptacle, and cholesterol test-capable biological test receptacle as well in similar fashion.

Similar to how there can be a test receptacle for a test element and perhaps a test element information sensor, in one embodiment, the user-friendly personal biological test system 100 may contain a single biological sampler receptacle 105 having a biological sample element information sensor 110. Such a sampler element or such can be for obtaining or sampling something from which a test can be conducted. And, similar to the test discussion, in one embodiment, the biological sample element information sensor 110 may recognize the presence a cartridge, test element, a biological sampler element 103, or some other element or indicator. In one embodiment, the biological sample element information sensor 110 may be, may contain, or may react to a memory capability or element, a sensing capability or element, a capability or element communicating, another device interfacing capability or element, a computational capability or element, an information capability or element, an intelligence capability or element (including but not limited to artificial intelligence), and adaptive capability or element, or a result producing capability or element. Again, in one embodiment, a single biological sampler receptacle 105 may be configured to mate with at least one removable biological sampler element 103 and that element may be configured to acquire a desired sample for a biological test. In one embodiment, the removable biological sampler element 103 may present a removable biological blood procedure element. And such a removable biological sampler element 103 may be configured to communicate with or through a single biological sampler receptacle 105. For example, for blood sampling, a removable biological sampler element 103 may have at least one custom lancet 131 which may be used to generate a blood sample.

As previously stated, different tests can be possible, which can involve including in a device more than one sense modalities such as can be necessary for different types of tests. In one embodiment, the user-friendly personal biological test system 100 may contain a first electronically activable, first sense modality element 106 configured for a first particular biological test type and a second as well. These may be electronic so activation and/or operation can be computationally handled more easily. A first electronically activable, first sense modality element 106 can be configured for a first particular biological test type. For example, this may contain an electronically activable glucose test element capable of recognizing the presence of an analyte sample. With more than one test type available, this may contain a selectively electronically activable computer routine configured to determine the concentration of glucose in an analyte sample. And a user-friendly personal biological test system 100 may contain a second electronically activable, second sense modality element 107 configured for a second particular biological test type too. For example, a second electronically activable, second sense modality element 107 configured for a second particular biological test type may involve an electronically activable A1C test element. Again, this may include a selectively electronically activable computer routine configured to determine a user's A1C level. Again, embodiments may contain an electronically activable ketone test element as well or alternatively. Here, a device may include a selectively electronically activable computer routine configured to determine a user's ketone level. Further and in similar fashion, it may contain an electronically activable cholesterol test element which may include a selectively electronically activable computer routine configured to determine a user's cholesterol level. Thus, it can be understood how a user-friendly personal biological test system 100 may contain a third electronically activable, third sense modality element that can be a variety of elements, such as but not limited to an electronically activable ketone test element, A1C test element, or cholesterol test element. And there can be a selectively electronically activable computer routine configured to determine a user's ketone level, A1C level, or cholesterol level. For this, a user-friendly personal biological test system 100 may contain a biological element test type sensor that informs what type of test is appropriate such as by sensing the particular cartridge inserted.

Such different tests can be achieved through a programming or computer processing capability and so in some embodiments a user-friendly personal biological test system 100 may contain generally a substantially instantaneous analysis biological test processor 112, or more particularly an automatically reconfigurable, substantially instantaneous analysis, multi-differential biological test processor 108 that is able to be reconfigured automatically such as in response to something sensed, act quickly in seconds or minutes, and can conduct completely different types of biological tests. And in some embodiments an automatically reconfigurable, substantially instantaneous analysis, multi-differential biological test processor 108 may be capable of selectively responding to a first electronically activable, first sense modality element 106, a second electronically activable, second sense modality element 107, and perhaps even a third electronically activable, third sense modality element. Such different modalities can be understood as different in their nature, not just in a different type of test feature (e.g., strip type or the like) with which the same analysis is conducted. This is applicable to combining glucose and A1C testing as the present technology allows in a user friendly, integrated fashion. Thus, with different test modalities, different capabilities, different analyses, or even different sensors can be needed and these can be combined in one device as can be appreciated. Further, in some embodiments, an automatically reconfigurable, substantially instantaneous analysis, multi-differential biological test processor 108 may be responsive to the biological test, or sample receptacle, or said biological test element information sensor 109 to facilitate the device automatically using information (even simplistic information) to activate, to disable, to prompt, or to otherwise act appropriately. For example, an automatically reconfigurable, substantially instantaneous analysis, multi-differential biological test processor 108 may act to be an automatically reconfigured in response to a biological test element sensor. For example, an automatically reconfigurable, substantially instantaneous analysis, multi-differential biological test processor 108 may communicate with, and enable or disable actions in response to a biological element presence or other type of sensor. As such, a processor can be an automatically reconfigurable, substantially instantaneous analysis, multi-differential biological test processor.

As mentioned, such processors can be configured to provide analysis results in not more than about 60 seconds, 15 seconds, or even 5 seconds and can thus present an automatically reconfigurable, substantially instantaneous analysis, multi-differential biological test processor configured to provide analysis results in not more than about 15 seconds, an automatically reconfigurable, substantially instantaneous analysis, multi-differential biological test processor configured to provide analysis results in not more than about 5 seconds, and an automatically reconfigurable, substantially instantaneous analysis, multi-differential biological test processor configured to provide analysis results in not more than about 60 seconds. In similar fashion, the device can return a result in a result in such times or such times can be longer such as by hold, pauses due to physical actions (as opposed to processed analysis) or so, and such times to return a results can be longer even including 5 minutes, 15 minutes, or 30 minutes such as is not uncommon in covid or other such testing.

By providing electronically activatable, or perhaps electro-operable, and/or electro-mechanical elements, a number of capabilities are possible that simple user manipulation or user determination could not achieve, or could not achieve in a needed (for practical use) test time frame such as a minute or less before a user loses interest or will cease the desired repetitive use. To facilitate this, in some embodiments, an automatically reconfigurable, substantially instantaneous analysis, multi-differential biological test processor 108 may have or be a pre-stored software routine selectable multi-differential biological test processor. As but one example, in some embodiments, the automatically reconfigurable, substantially instantaneous analysis, multi-differential biological test processor 108 may be configured or programmed as an automatic sensor-deterministically configured multi-differential biological test processor. For example, by programming, the processor may be or may present a cartridge presence sensor-deterministically configured multi-differential biological test processor so that it acts, or not, at least partially based on sensing a cartridge presence and make a determination about proper configuration such as programming. With differing tests, it may be configured to be automatically reconfigurationally responsive to a plurality of automatic differential test setting user interchangeable biological blood test-based cartridges and thus act to automatically achieve perhaps nuanced differences in a test when appropriate in a way that users would not usually discern.

As shown, a user-friendly personal biological test system 100 may contain a user test output 111 and this may be responsive to an automatically reconfigurable, substantially instantaneous analysis, multi-differential biological test processor 108. Such an output may include a user communication display, user directive display, user input accommodative display, or some combination thereof as those skilled in the art would readily understand.

Smart cartridges can be sensed and that information can cause automatic actions and/or configurations. Thus, in some embodiments, a biological element test type sensor may be a biological element manufacture information sensor, a biological element multiple common feature information sensor, a biological element expiration information sensor, a biological element number of uses information sensor, a biological element number of multiple common features information sensor, a biological element recency of use information sensor, a biological element time of use information sensor, a biological element time since last use information sensor, or any combination thereof.

Important to user needs and repetitive use as can be medically desired is the form factor or external shape and size of the device. In this regard, a device can present a fully contained, pocket-transportable, user biological test form factor. This fully contained, pocket-transportable, user biological test form factor may have a diagonal dimension as measured from opposite corners of less than or equal to about 4.6 inches, about 12 cm, about 5.6 inches, about 14 cm, about 6 inches, or about 15 cm. Similarly, a fully contained, pocket-transportable, user biological test form factor may be a smart phone sized fully contained, pocket-transportable, user biological test form factor in that it can be similarly sized (e.g., within 5% of at least the main, perhaps non-thickness, dimensions even including a common protective case) to a smart phone such as now common iPhones (SE, 13, 14, 14 Plus, etc.), Google (6a, 7a, 7, 6, etc.), Samsung (S23, S23+, Z, Flip 4. Etc.), and the like. Further, other dimensions can include having a thickness of less than or equal to about ½ inch, about 0.6 inches, about 1 cm, about 15 mm, about ¾ inch, about 1 inch, or about 2 cm. Current sizing of about 4.6 inches diagonal and 0.6 inches in thickness is within these values, of course. For user familiarity, pocket bulge usual acceptability, and general usability, in some embodiments, a fully contained, pocket-transportable, user biological test form factor may be a six exterior-sided fully contained, pocket-transportable, user biological test form factor and this can include having six sides that are similar to a smart phone. Further, this six exterior-sided fully contained, pocket-transportable, user biological test form factor may include a removable element surface such as an exterior surface of an installed removable cartridge. In one embodiment, a six exterior-sided fully contained, pocket-transportable, user biological test form factor may have a first exterior part of the six exterior sided fully contained, pocket-transportable, user biological test form factor as a first removable cartridge surface, and a second exterior part of the six exterior sided fully contained, pocket-transportable, user biological test form factor as a second removable cartridge surface as shown. With appropriate sizing and shaping, in some embodiment, a six exterior-sided fully contained, pocket-transportable, user biological test form factor may be a smart phone shaped fully contained, pocket-transportable, user biological test form factor. And, as shown in FIGS. 37-42, among others, a fully contained, pocket-transportable, user biological test form factor may be an aesthetically shaped fully contained, pocket-transportable, user biological test form factor. Thus, a user-friendly personal biological test system 100 may be configured to house all of an automatically reconfigurable, substantially instantaneous analysis, multi-differential biological test processor 108, a single multiple differential biological test receptacle 104, a removable biological test element 102, a single biological sampler receptacle 105, a removable biological sampler element 103, and a user test output 111 within the desired fully contained, pocket-transportable, user biological test form factor.

A particularly desirable feature of embodiments can be having user input to customize actions or do actions. For example, embodiments can include a user programmable movement element. Further, as mentioned, there can be a computationally decisionally-based user programmable movement element. On the sampler element there can be a user reprogrammable biological sampler movement element. This can be helpful by removing a dependency on imprecise or difficult user movements such as by a form factor contained, electro-operable biological test element 113 or a similar sampler element. As can be appreciated, a form factor contained, electro-operable biological test element 113 may be configured to run a particular biological test. This can occur once installed or mated such as with a form factor contained, electro-operable biological test element 113 configured to mate with the biological test receptacle 104. Again, operations or movements can be electro-operable such as through a portable device on-board software-controlled movement biological test element. The same can exist for the sampler element. Thus, in some embodiments, a user-friendly personal biological test system 100 may contain a user sampler configuration selector 114 capable of inputting a user sampling selection. This can exist in many ways, including but not limited to having: a user sampler configuration selector 114 capable of inputting a user sampling selection, a user reconfigurable sampler action timing selector (e.g., when a lancet acts), a user reconfigurable sampler action strength selector (e.g., how forceful a lancet acts), a user reconfigurable common feature repetition selector (e.g., how often a lancet is reused), or the like. Thus, there can also be an electro-mechanical, user-personalizable biological sampler control processor 115, and a user reprogrammable biological sampler control processor. In some embodiments, a user reprogrammable biological sampler control processor may be responsive to a user sampler configuration selector 114 capable of inputting a user sampling selection such as by a touch screen, button, dial, or the like. In this manner, an electro-mechanical, user-personalizable biological sampler control processor 115 may be responsive to a user sampler configuration selector 114 that is capable of inputting a user sampling selection.

With this capability of allowing a user input or selection, it may be desirable to make sure inputs are acceptable or even safe. In some embodiments, a user-friendly personal biological test system 100 may contain a sampler selection efficacy analyzer 116 that acts perhaps automatically to assess the efficacy, safety, or other propriety of a user selection. In some embodiments, a user reprogrammable biological sampler control processor may be responsive to a sampler selection efficacy analyzer 116 in that it may act or not act based on if that selection is deemed appropriate. Thus, an electro-mechanical, user-personalizable biological sampler control processor 115 may be responsive to a sampler selection efficacy analyzer 116 and may act or not act such as to operate a form factor contained, electro-mechanically controlled biological sampler 117. As can be appreciated, in some embodiments, a form factor contained, electro-mechanically controlled biological sampler 117 may be configured to acquire a desired sample for a particular biological test in accordance with instructions from an electro-mechanical, user-personalizable biological sampler control processor 115. For example, this device can operate or not operate a portable device on-board software-controlled movement biological sampler element 103 where software is on-board such an element.

As mentioned, the device may operate or refuse to operate. In some embodiments, the sampler selection efficacy analyzer 116 may be configured to automatically disable operation of a form factor contained, electro-mechanically controlled biological sampler 117 when a user sampling selection is determined to be unacceptable. This can occur, for but one example, when a sampler selection efficacy analyzer 116 is configured as a user selection safety analyzer that assesses safety in accordance with preset or stored criteria. If such criteria are not met, a user selection safety analyzer may act as a test safety disable element and there may even be a user reselection prompt to tell the user why and/or allow a new selection. With respect to having an appropriate cartridge or the like, in some embodiments, a user selection safety analyzer may act as a test safety disable element and a user cartridge action prompt. The placement of an acceptable cartridge can be criteria for a test initiation safety analyzer. In some embodiments, a test initiation safety analyzer may be an inserted cartridge information analyzer that obtains information from the cartridge and analyzes it.

In a more general sense, this technology can provide a user-friendly personal biological test system 100 that may contain a first biological action receptacle 118, an instantaneous analysis biological test processor 112 that is responsive to a first biological action receptacle 118, a first removable, form factor contained, electro-mechanical biological user element 119 that may be configured to mate with said first biological action receptacle 118, second biological action receptacle 120, an instantaneous analysis biological test processor 112 that is responsive to the second biological action receptacle 120, and a second removable, form factor contained, electro-mechanical biological user element 121 that may be configured to mate with a second biological action receptacle 120. And all this may be contained in a fully contained, pocket-transportable user biological test form factor 122 configured to house a substantially instantaneous analysis biological test processor 112, a first biological action receptacle 118, a first removable form factor contained, electro-mechanical biological user element 119, a second biological action receptacle 120, a second removable, form factor contained, electro-mechanical biological user element 121, and a user test output 111 within that pocket-transportable form factor. Again, generally, in one embodiment, either the first removable, form factor contained, electro-mechanical biological user element 119 or the second removable, form factor contained, electro-mechanical biological user element 121 may contain multiple common event features. And these common event features may be multiple automatically sequenced common event features configured to be sequenced within a biological user element 119, 121. And, in general, a user-friendly personal biological test system 100 may have a test disable element in some embodiments and this may be a test disable element comprises a test disable-when-user-selection inappropriate element. Further, in some embodiments, a test disable-when-user-selection inappropriate element may have at least one of the following: (1) a cartridge presence-based disable element; (2) a cartridge date-based disable element; (3) a cartridge expiration date-based disable element; (4) a cartridge prior use-based disable element; (4) a cartridge time of use-based disable element; (6) other cartridge based disable elements; or (7) other user based disable elements.

Further, the technology can include processes for user-friendly personal biological testing. In one embodiment, a process for user-friendly personal biological testing may include one or more of the following: (1) establishing an automatically reconfigurable, substantially instantaneous analysis, multi-differential biological test processor 108 having a first electronically activable, first sense modality element 106 configured for a first particular biological test type and a second electronically activable, second sense modality element 107 configured for a second particular biological test type; (2) automatically selecting a particular biological test modality 106, 107 to perform through operation of said automatically reconfigurable, substantially instantaneous analysis, multi-differential biological test processor 108; (3) automatically configuring said automatically reconfigurable, substantially instantaneous analysis, multi-differential biological test processor 108 for said selected particular biological test modality 106, 107; (4) conducting said biological test from said pocket-transportable, user biological test form factor 122; and (5) outputting a user test output 111 responsive to said substantially instantaneous analysis biological test processor 108 from said pocket-transportable, user biological test form factor 122. In another process, some embodiments can provide a process for user-friendly personal biological testing that may include one or more of the following steps: (1) establishing an automatically reconfigurable, substantially instantaneous analysis, multi-differential biological test processor 108 having a first electronically activable, first sense modality element 106 configured for a first particular biological test type and a second electronically activable, second sense modality element 107 configured for a second particular biological test type; (2) automatically selecting a particular biological test modality 106, 107 to perform through operation of said automatically reconfigurable, substantially instantaneous analysis, multi-differential biological test processor 108; (3) automatically configuring said automatically reconfigurable, substantially instantaneous analysis, multi-differential biological test processor 108 for a selected particular biological test modality 106, 107; (4) conducting said biological test from a pocket-transportable, user biological test form factor 122; and outputting a user test output 111 responsive to a substantially instantaneous analysis biological test processor 108 from a pocket-transportable, user biological test form factor 122. In some embodiments, another process for user-friendly personal biological testing may include one or more of the following steps: (1) establishing a substantially instantaneous analysis biological test processor 108 for biological testing fully contained within a pocket-transportable, user biological test form factor 122; (2) providing a biological test receptacle 104 to which said substantially instantaneous analysis biological test processor 108 is responsive; (3) inserting a form factor contained, electro-operable biological test element 113 into a biological test receptacle 104; (4) providing a biological sampler receptacle 105 to which a substantially instantaneous analysis biological test processor 108 is responsive; (5) inserting a form factor contained, electro-mechanical biological sampler element 103 into a biological sampler receptacle 105; (6) allowing a user sampler configuration selection; (7) using the efficacy analyzer 116 on a user sampler configuration selection; (8) controlling said electro-mechanical biological sampler element 103 in response to a step of using the efficacy analyzer 116 and a user sampler configuration selector 114; (9) conducting said biological test from a pocket-transportable, user biological test form factor 122; and (10) outputting a user test output 111 responsive to a substantially instantaneous analysis biological test processor 108 from a pocket-transportable, user biological test form factor 122. Further, in some embodiments, a process for user-friendly personal biological testing may include one or more of the following steps: (1) establishing a substantially instantaneous analysis biological test processor 108 for biological testing fully contained within a pocket-transportable, user biological test form factor 122; (2) providing a first biological action receptacle 118 to which said substantially instantaneous analysis biological test processor 108 is responsive; (3) inserting a first removable, form factor contained, electro-operable biological user element 119 into a first biological action receptacle 118; (4) providing a second biological action receptacle 120 to which a substantially instantaneous analysis biological test processor is responsive 108; (5) inserting a second removable, form factor contained, electro-mechanical biological user element 121 into a second biological action receptacle 120; (6) conducting a biological test from a pocket-transportable, user biological test form factor 122; and (7) outputting a user test output 111 responsive to a substantially instantaneous analysis biological test processor 108 from a pocket-transportable, user biological test form factor 122.

Figure 9:
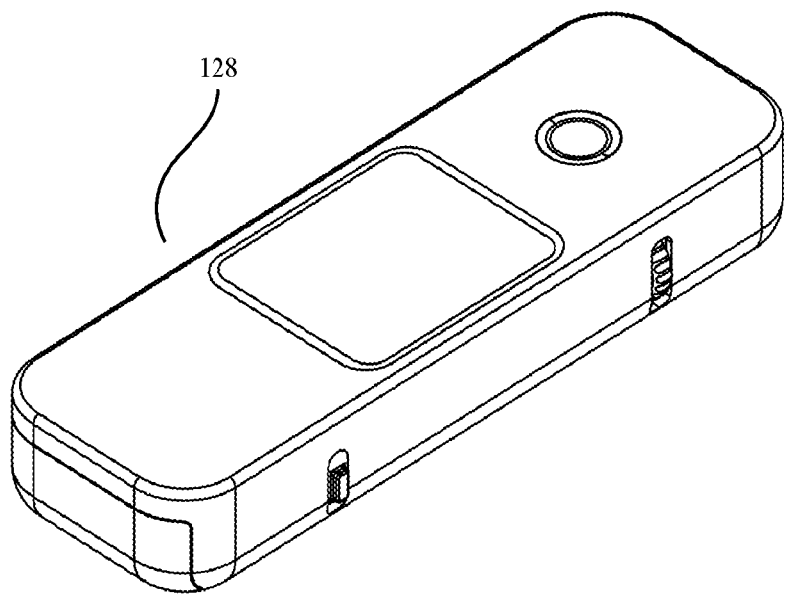
FIG. 9 illustrates an embodiment of an analyte test meter having one particularly aesthetically designed form factor.
Figure 10:
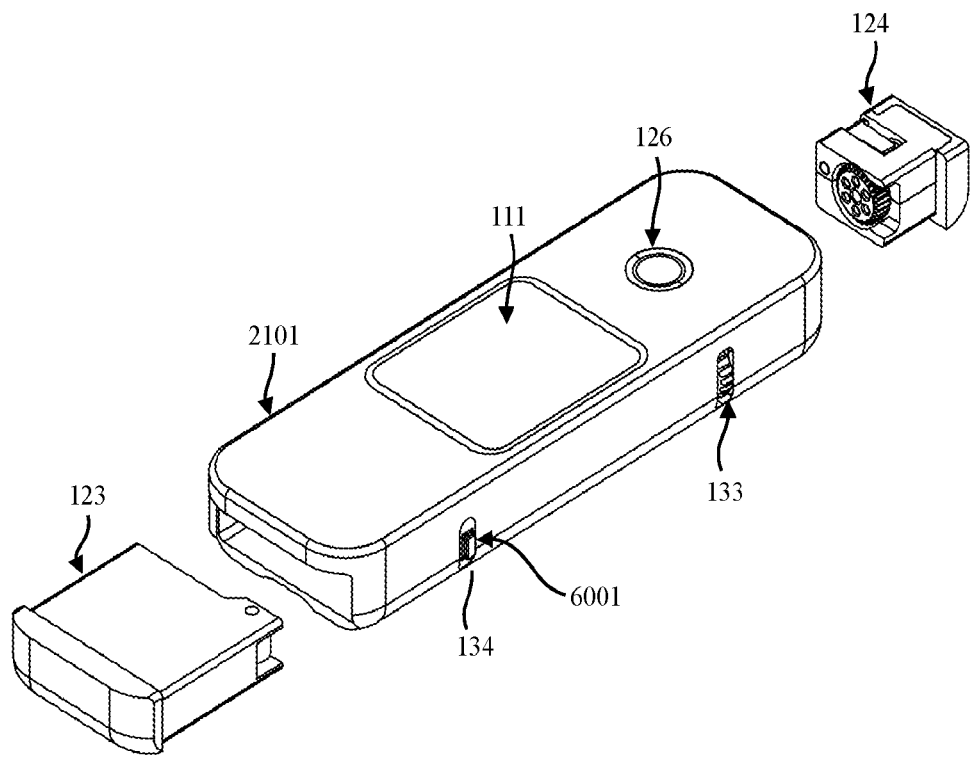
FIG. 10 illustrates an embodiment with a test cartridge, lancing cartridge, tactile button, meter housing, adjustable gear wheel, and a test strip exit port.
Figure 11:
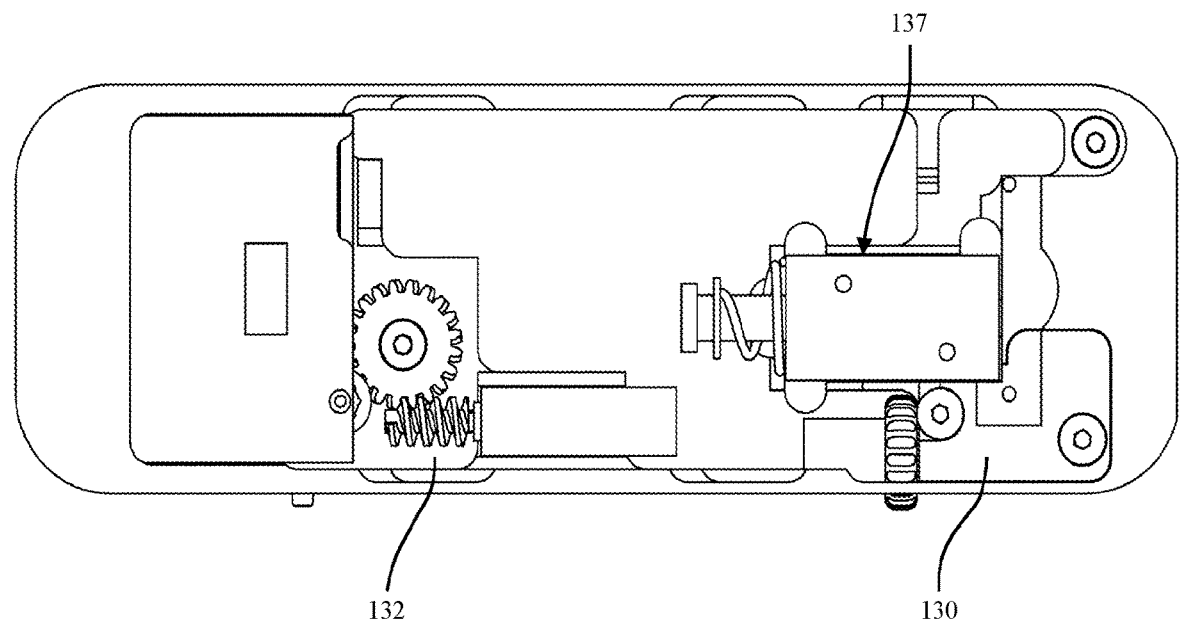
FIG. 11 internally illustrates an embodiment with an adjustable lancet selection mechanism, an adjustable test strip driving mechanism, and a solenoid.
Figure 12:
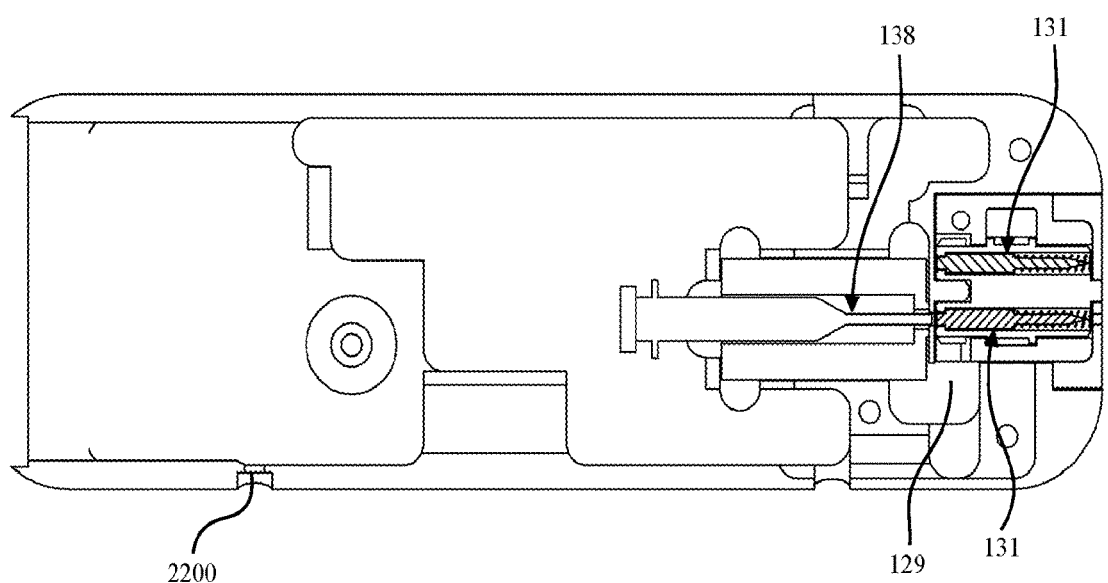
FIG. 12 illustrates an embodiment of an internal element having custom lancets, and a solenoid plunger.
Figure 13:
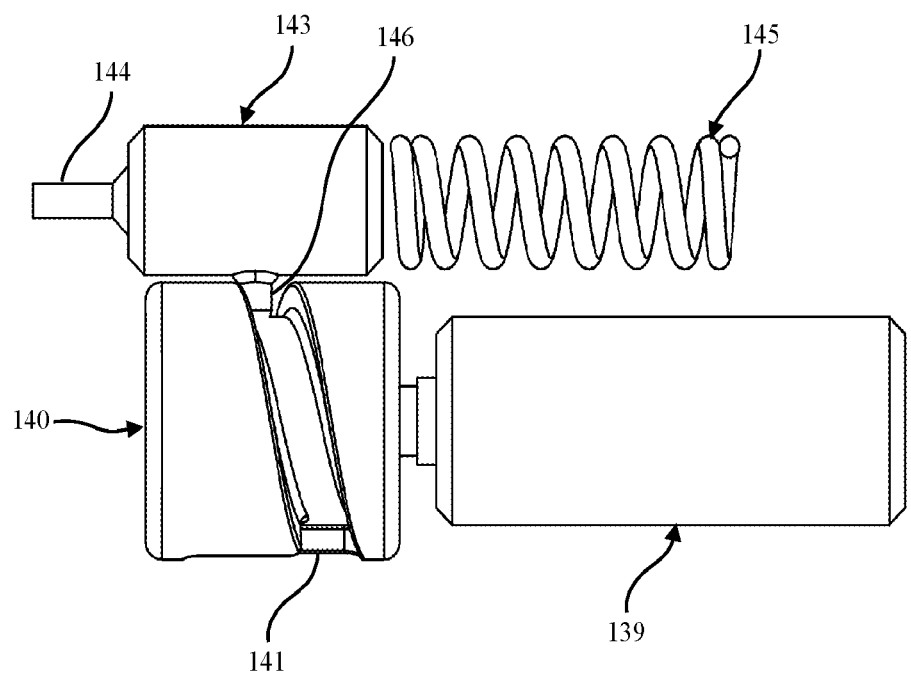
FIG. 13 illustrates an embodiment of a cam system.
Figure 14:
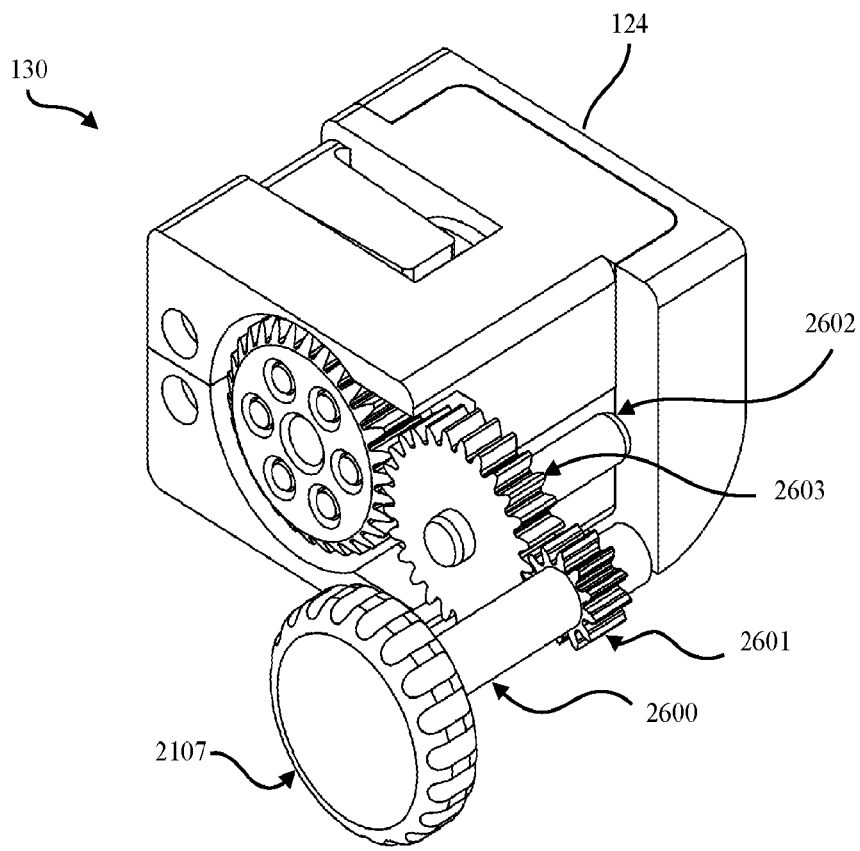
FIGS. 14, 15, 16, and 17 illustrate embodiments of an adjustable lancet selection mechanism.
Figure 15:
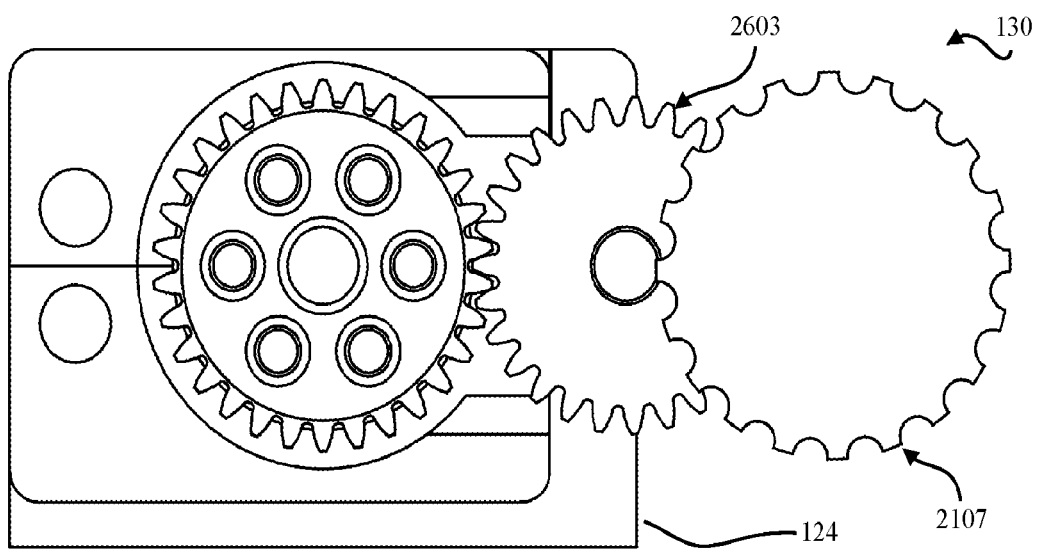
Figure 16:
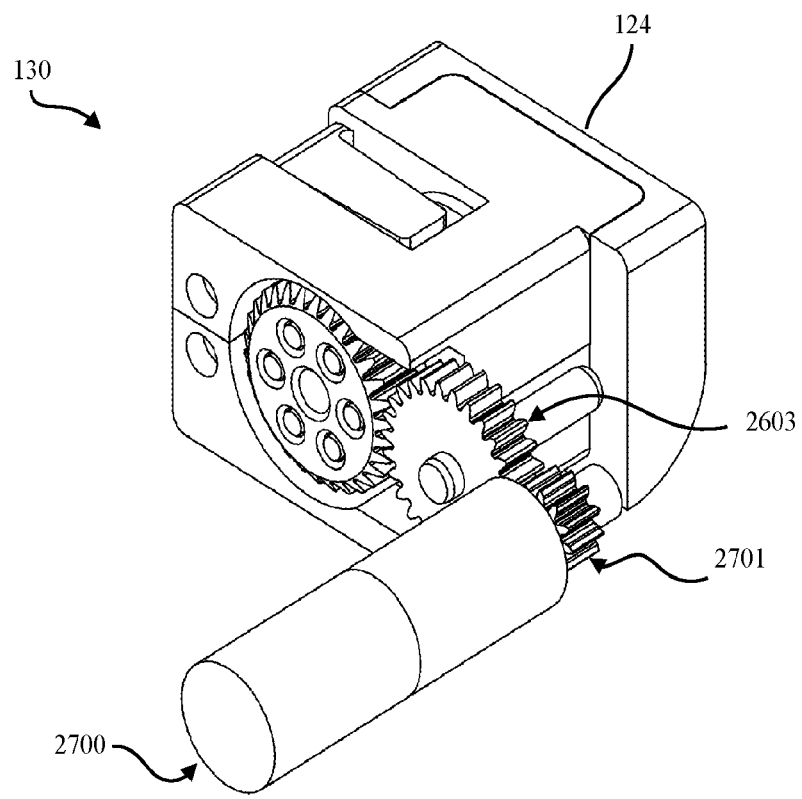
Figure 17:
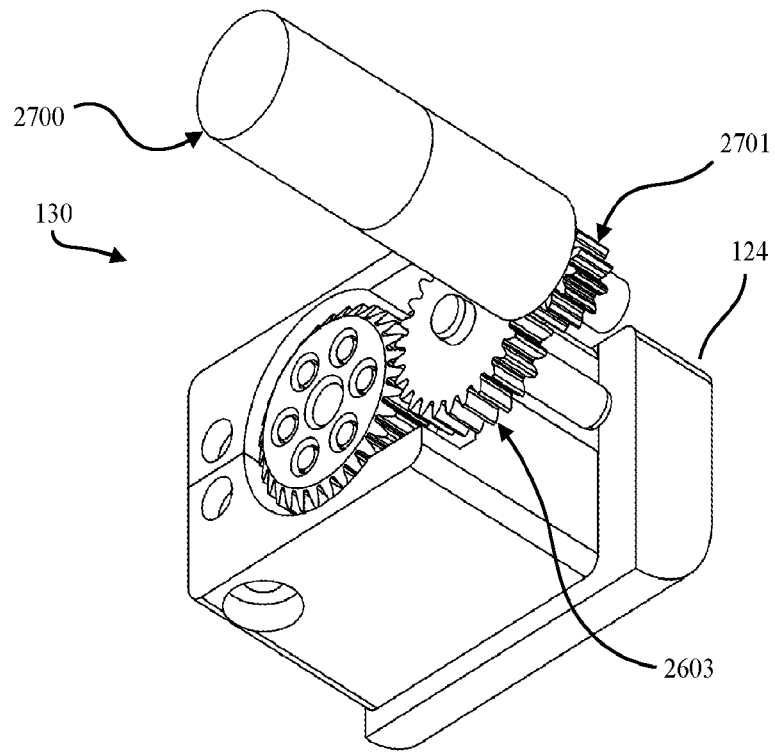
Figure 18:
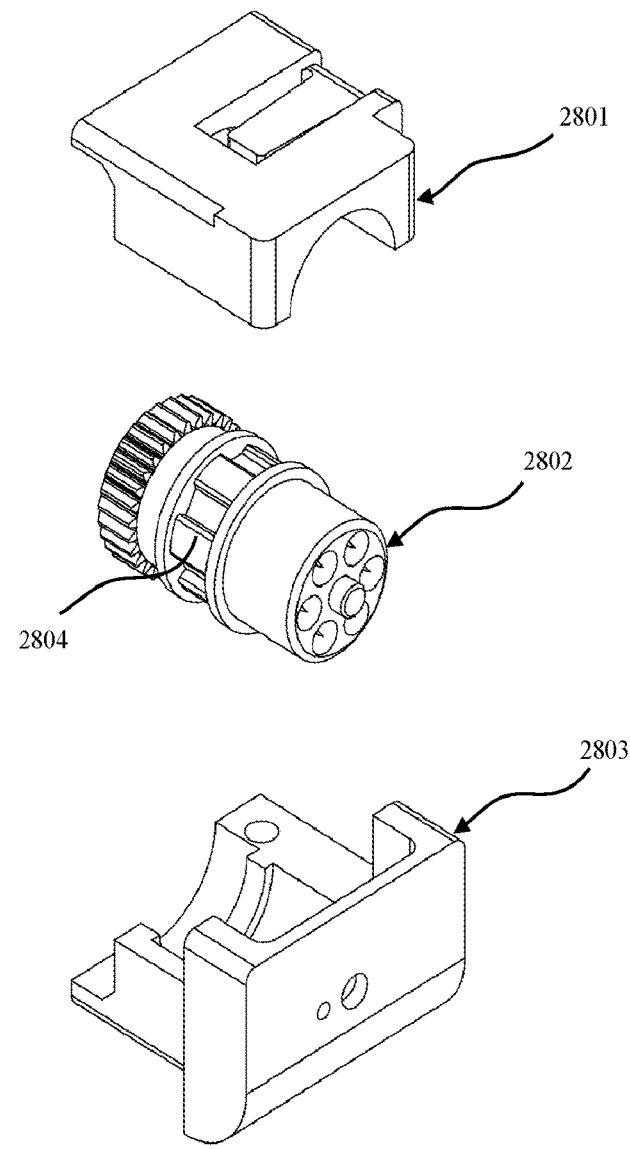
FIGS. 18, 19, 20, 21, 22, 23, 24, 25, 26, 27, and 28 illustrate embodiments of a lancet cartridge.
Figure 19:
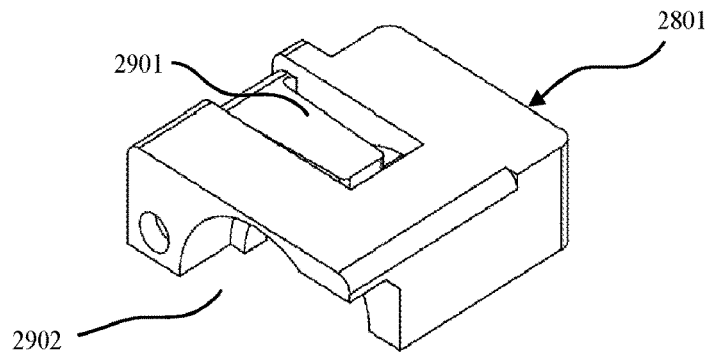
Figure 20:
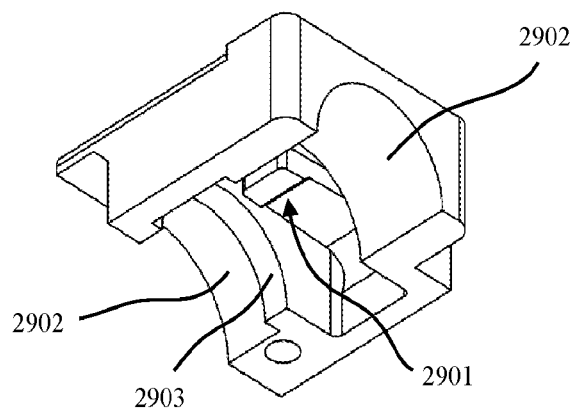
Figure 21:
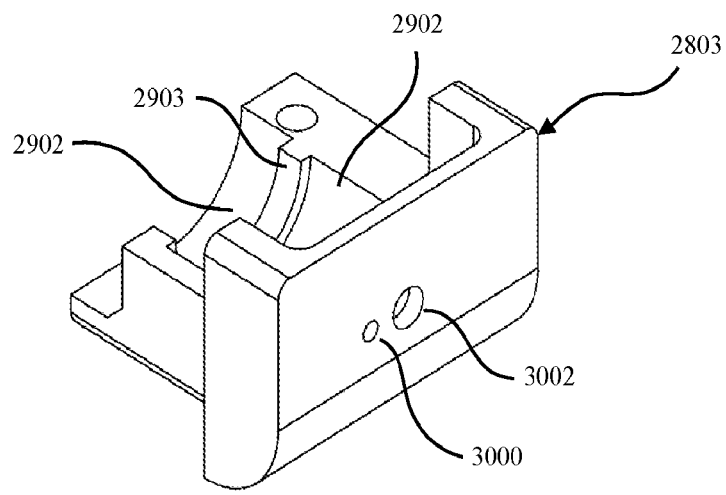
Figure 22:
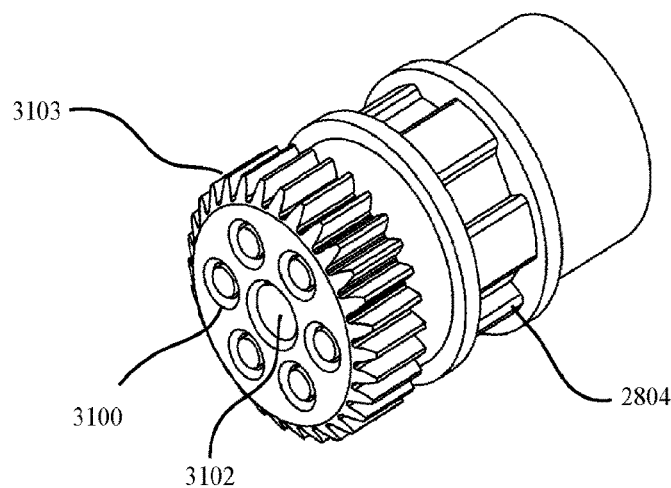
Figure 23:
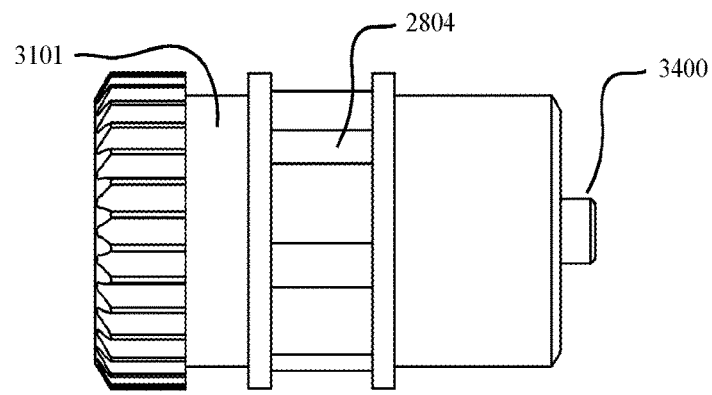
Figure 24:
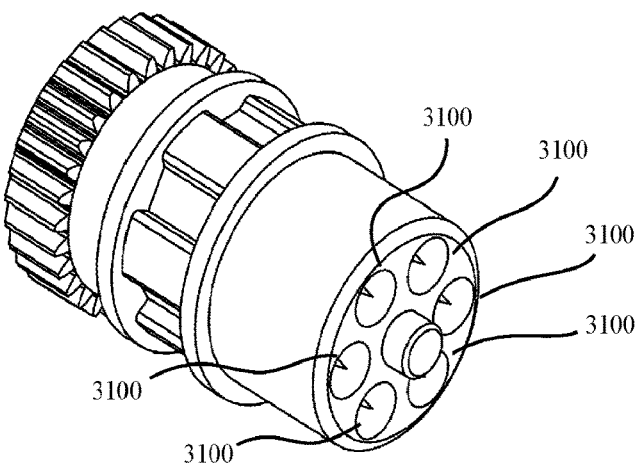
Figure 25:
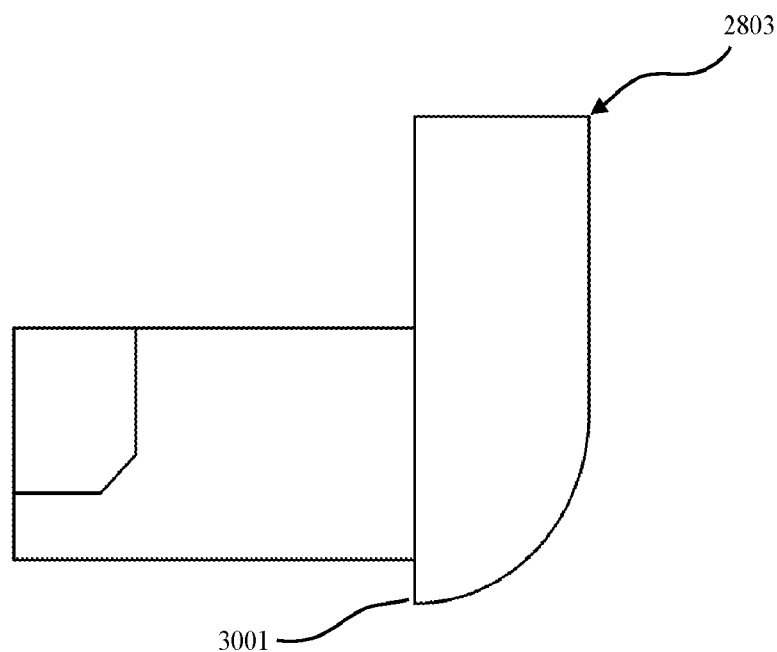
Figure 26:
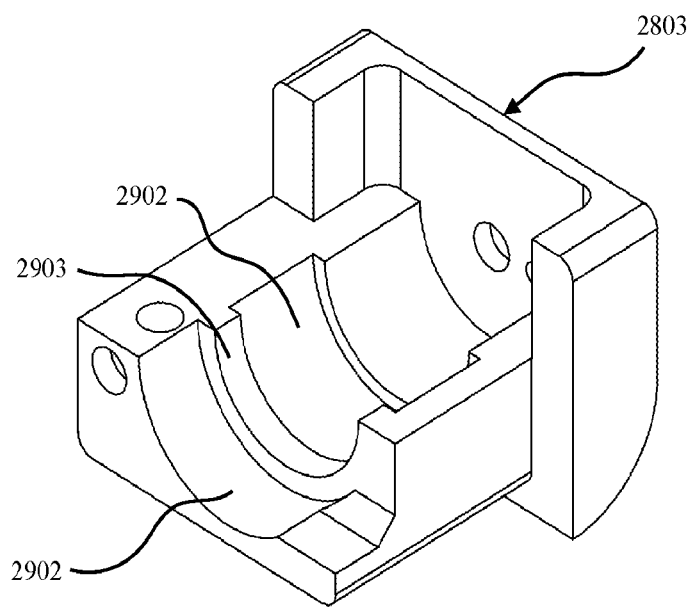
Figure 27:
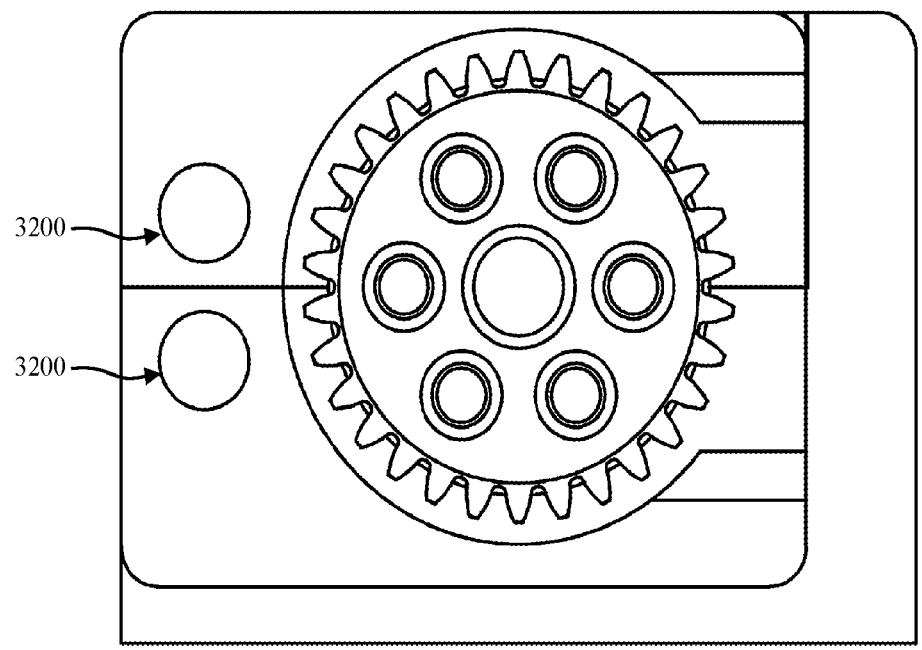
Figure 28:
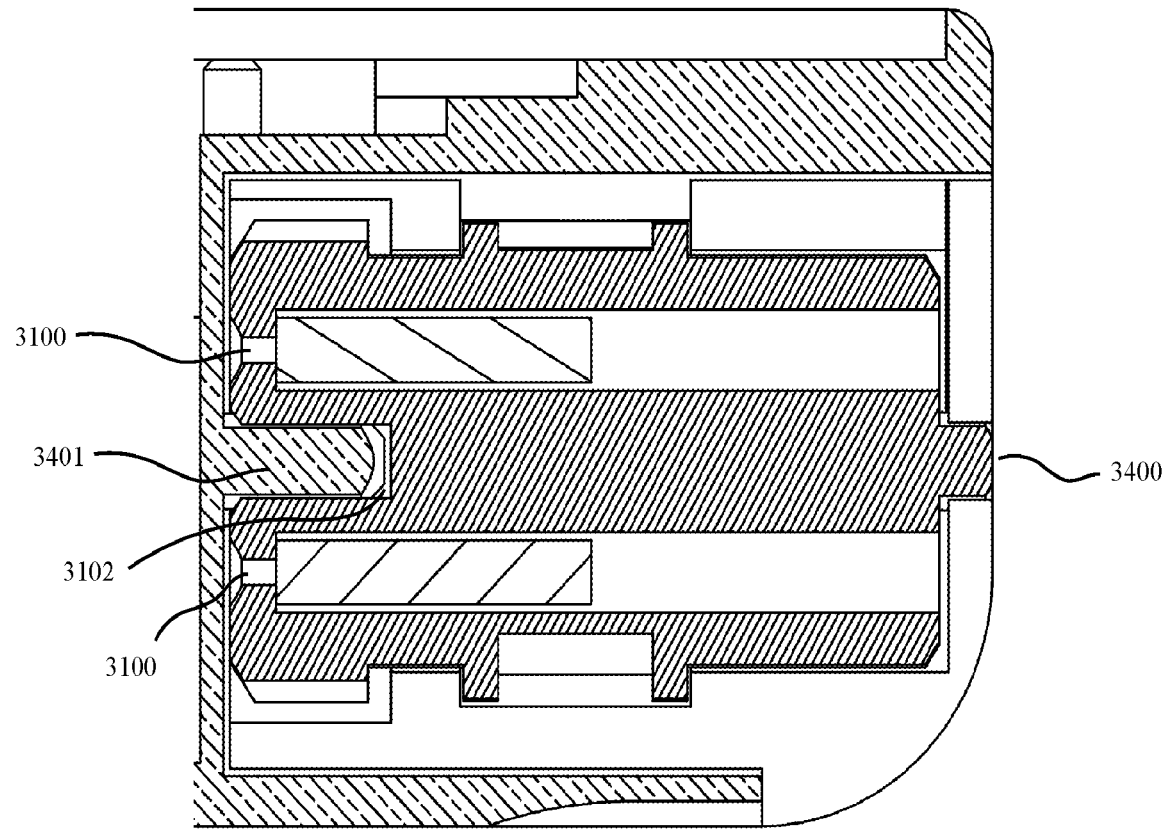
Figure 29:
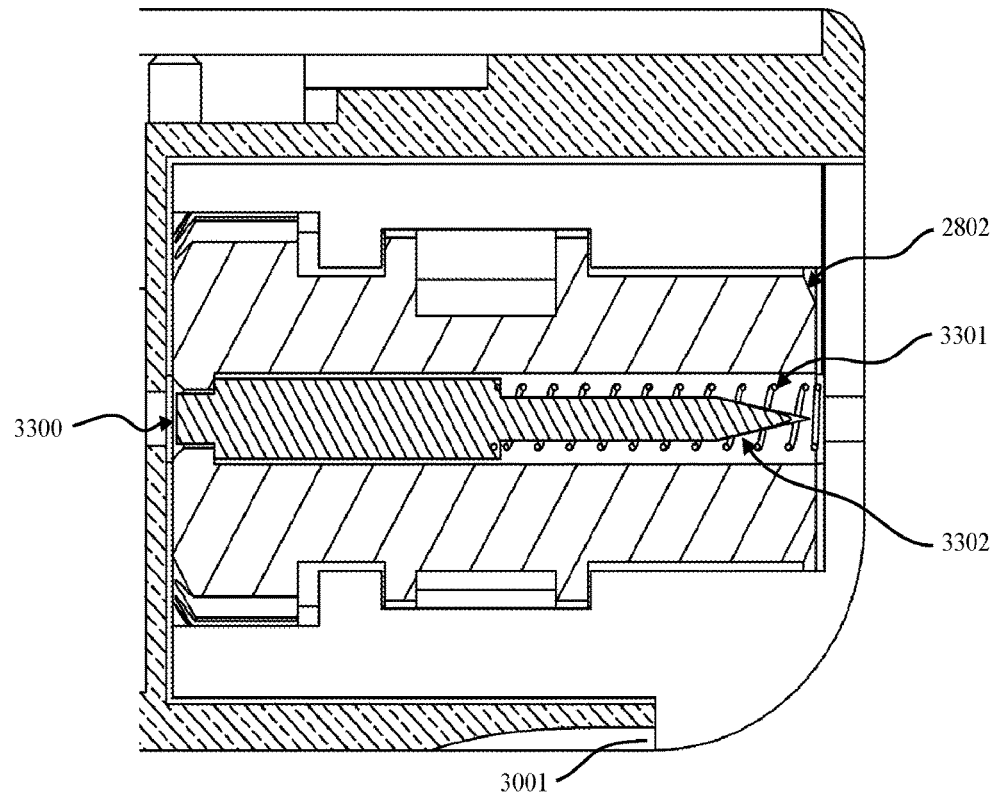
FIG. 29 illustrates an embodiment of a lancing cartridge and custom lancets.
Figure 30:
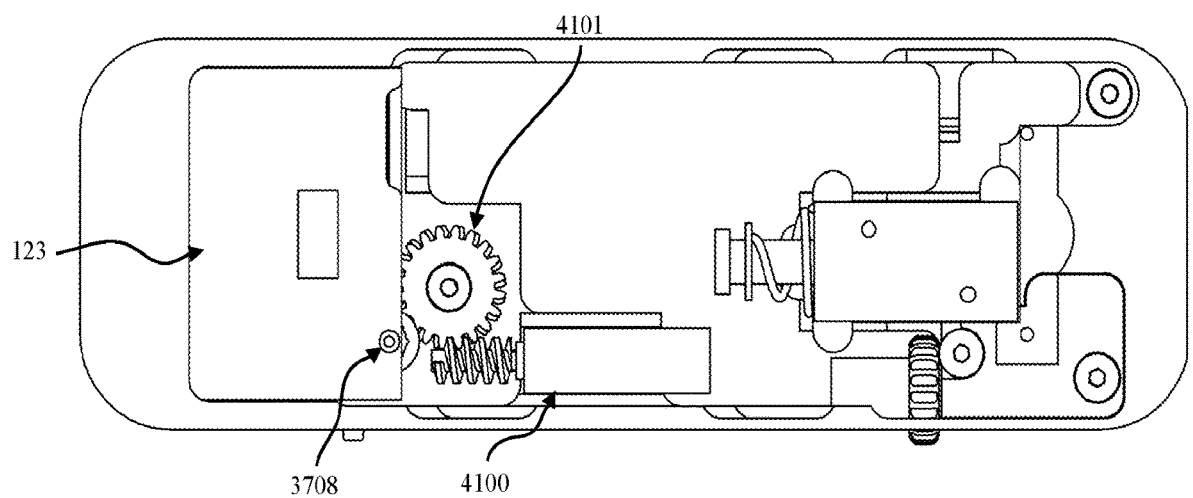
FIG. 30 illustrates an embodiment of an adjustable test strip driving mechanism.
Figure 31:
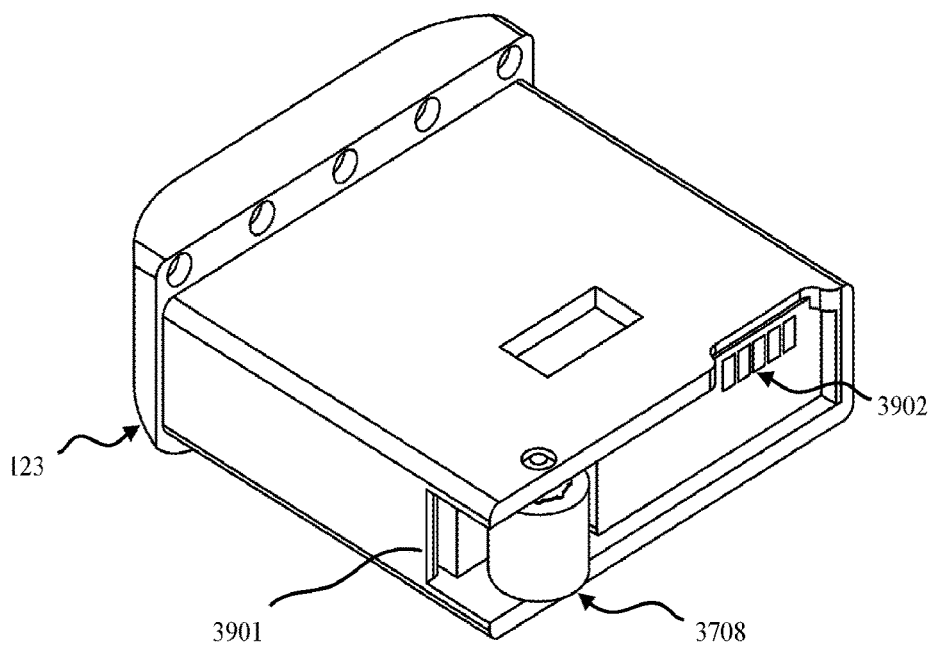
FIGS. 31 and 32 illustrate an embodiment of a test cartridge.
Figure 32:
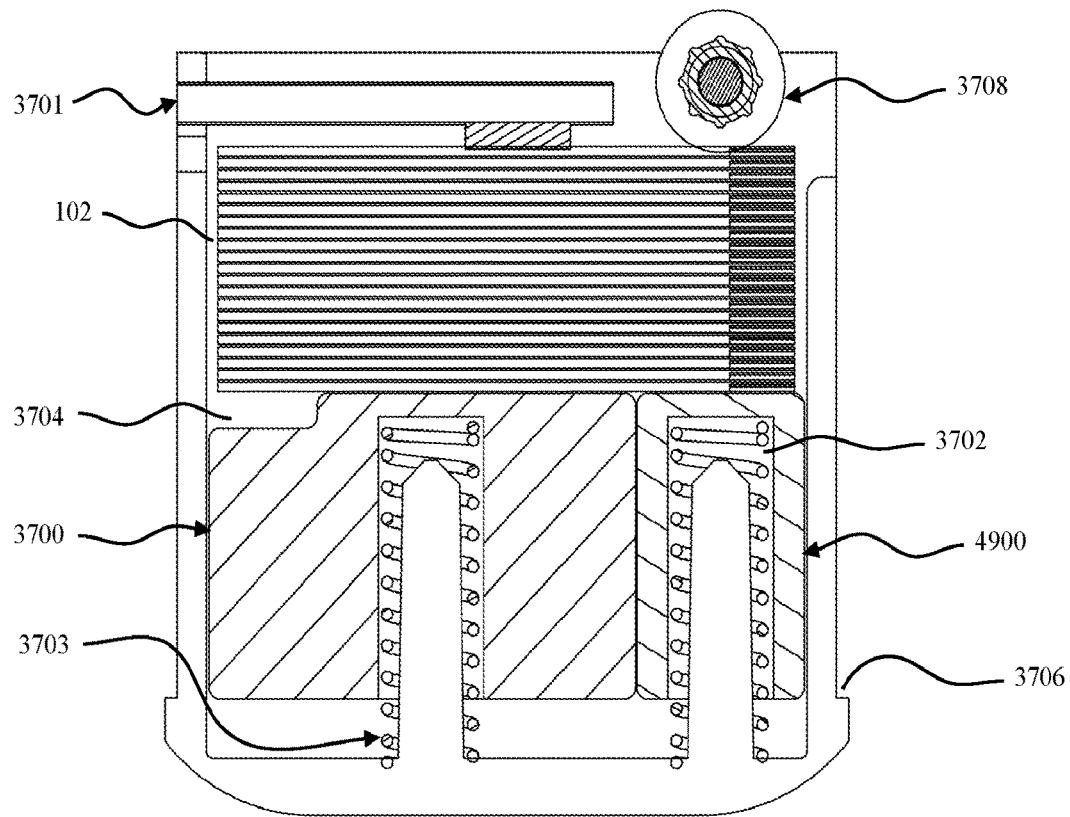
Figure 33:
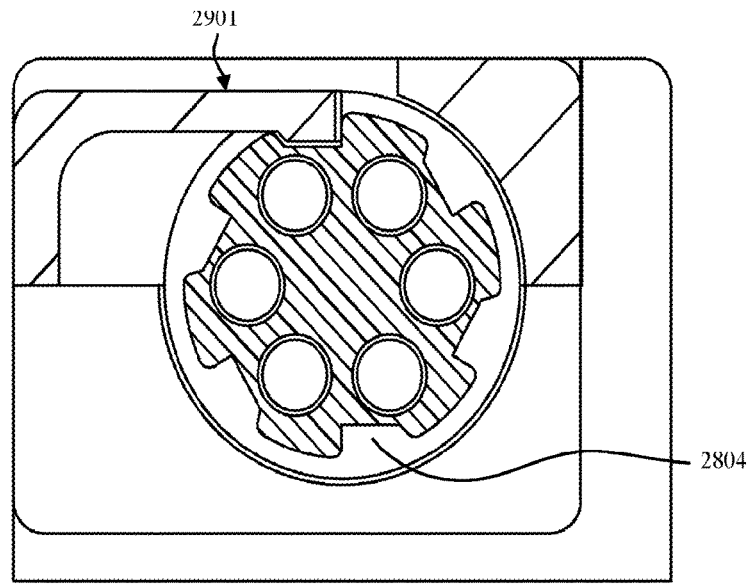
FIG. 33 illustrates an embodiment of a lancing cartridge and a snap lock lever and channels.
Figure 34:
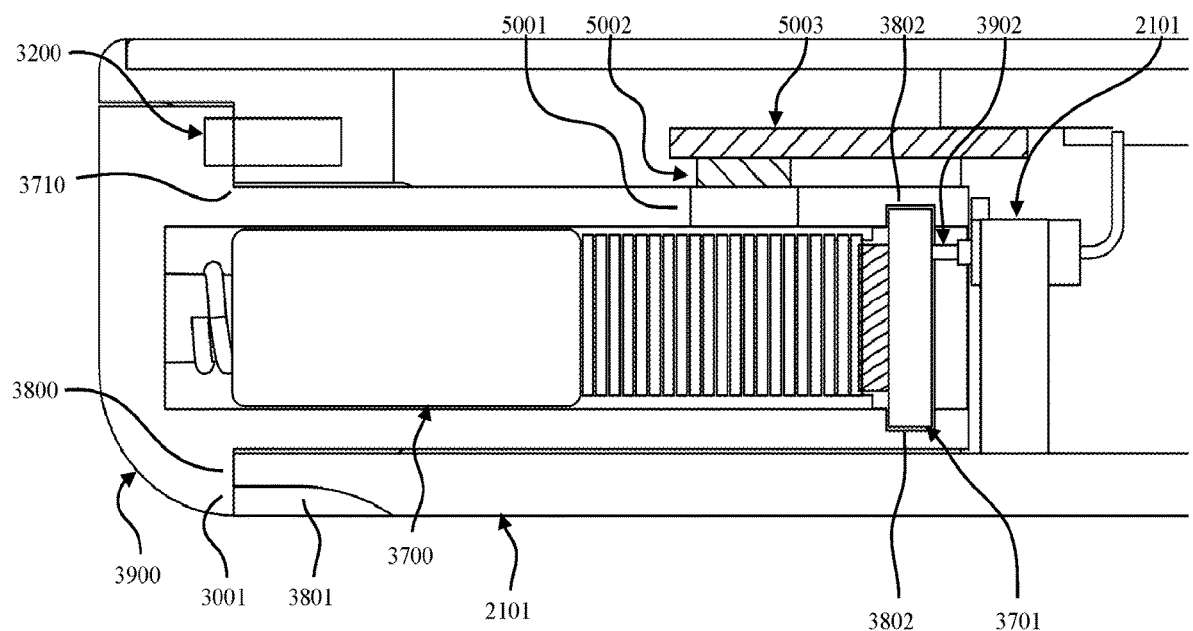
FIG. 34 illustrates an embodiment of a test cartridge.
Figure 35:
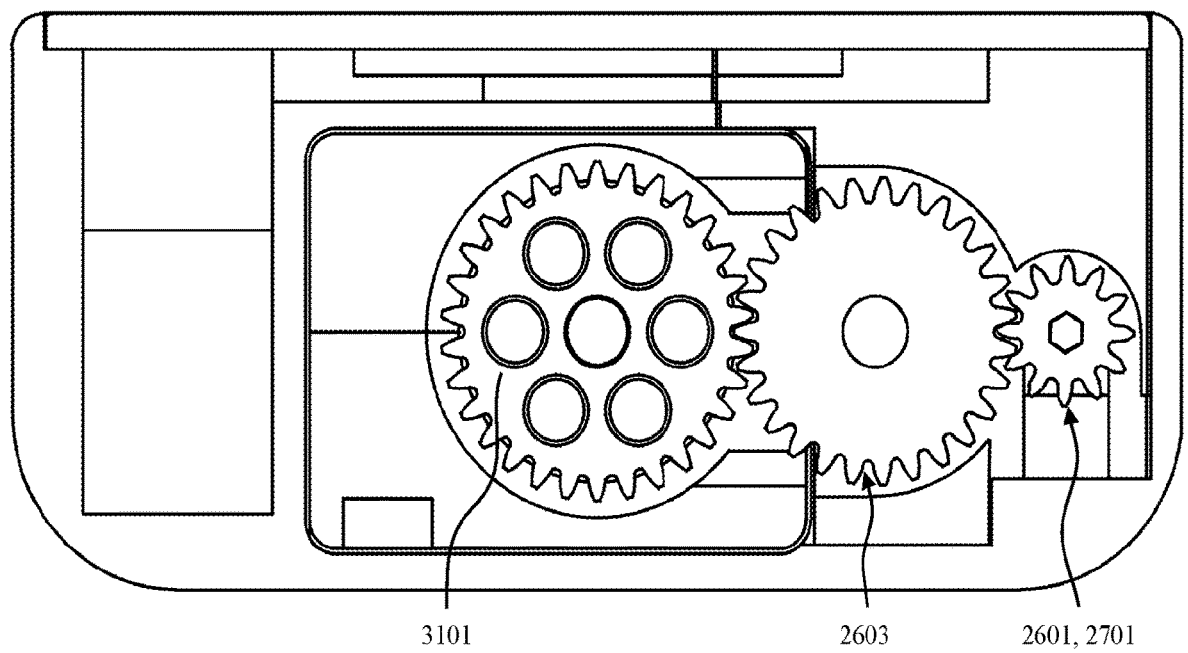
FIG. 35 illustrates an embodiment of an adjustable lancet selection mechanism.
Figure 36:
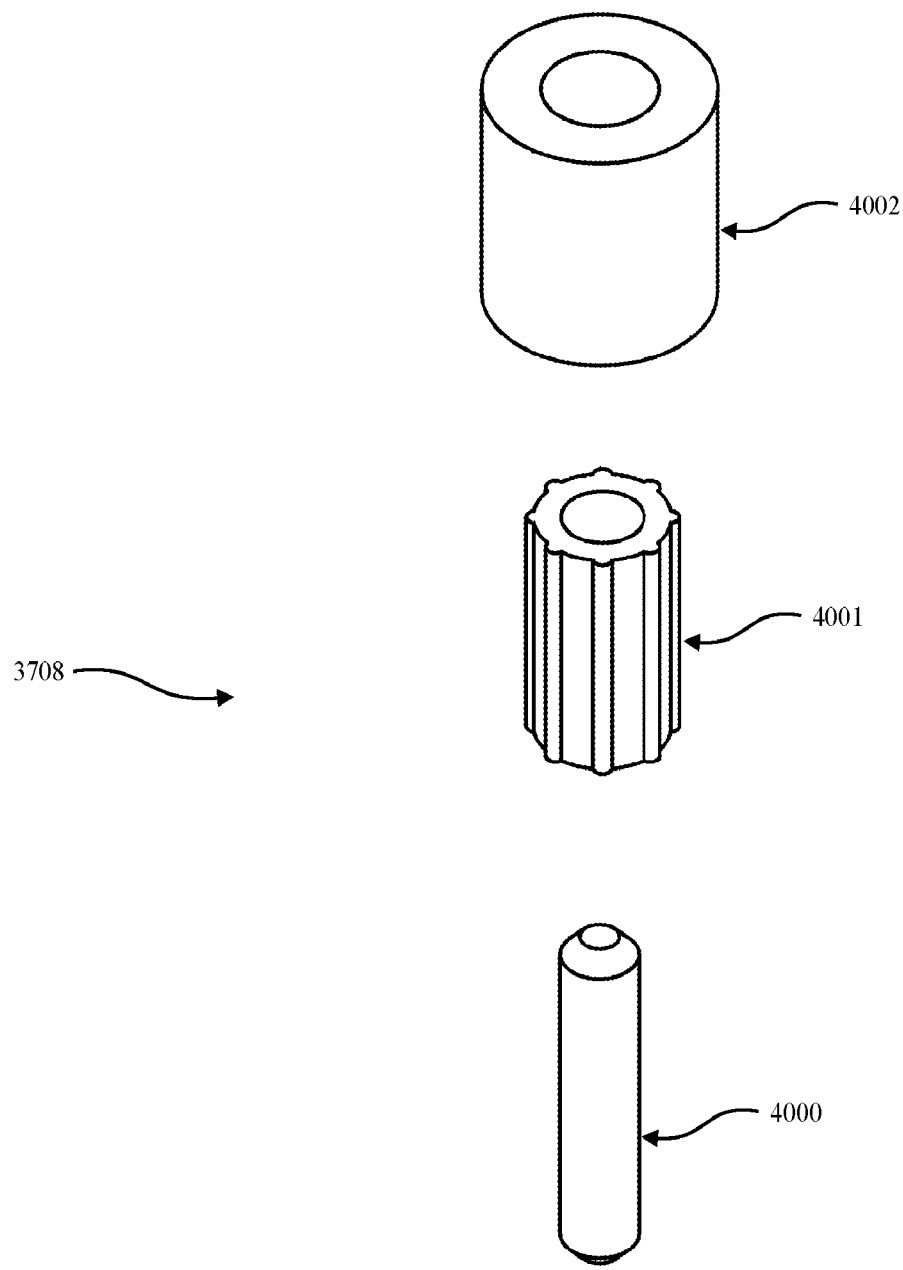
FIG. 36 illustrates an embodiment of a drive wheel.
Figure 37:
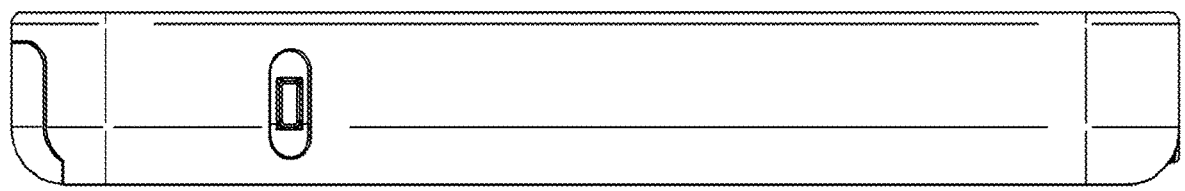
FIGS. 37, 38, 39, 40, 41, and 42 illustrate features of an aesthetic form factor design showing all elements with some removable by dashing if or when desired.
Figure 38:
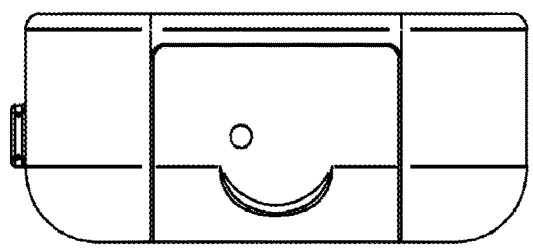
Figure 39:
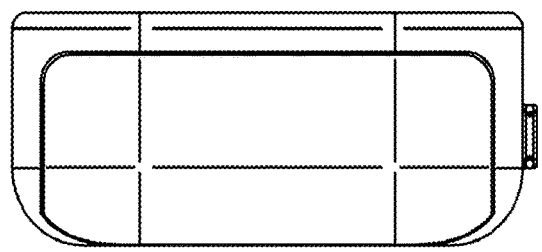
Figure 40:
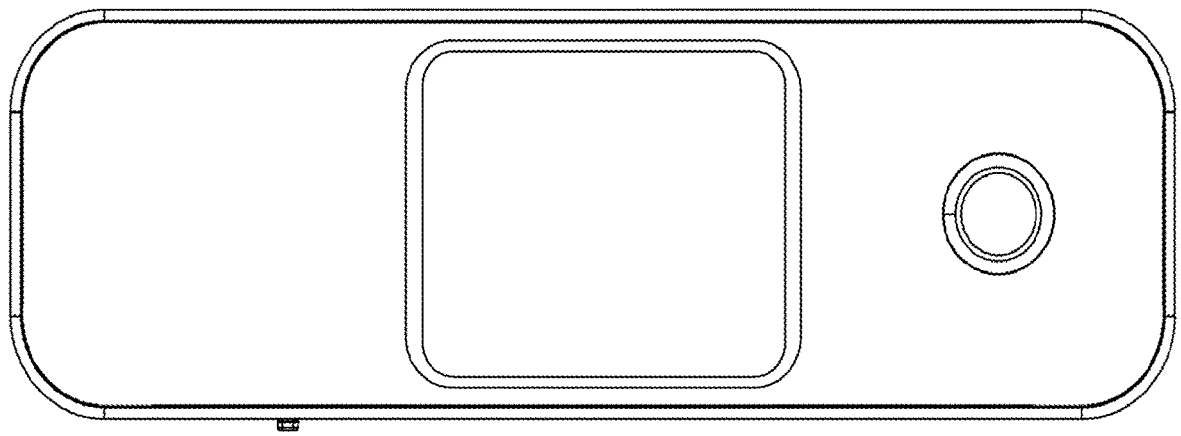
Figure 41:
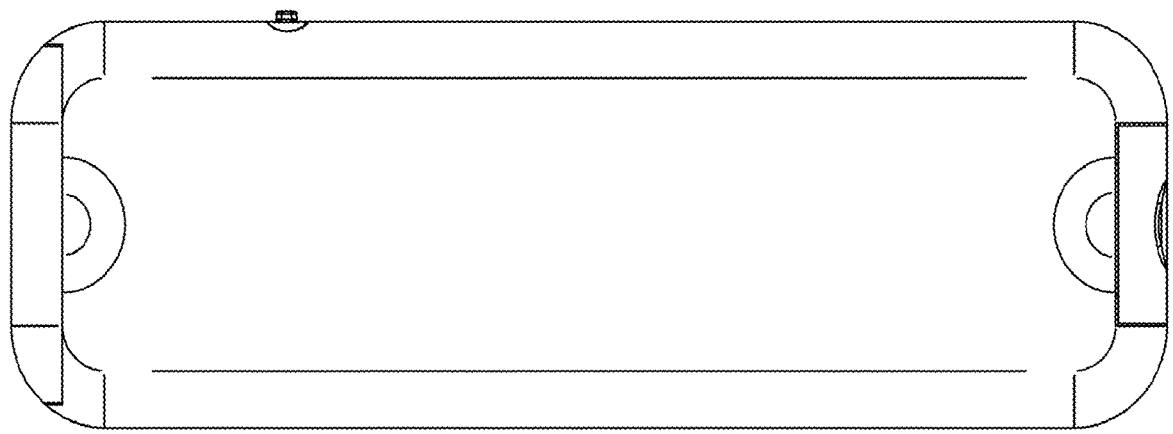
Figure 42:
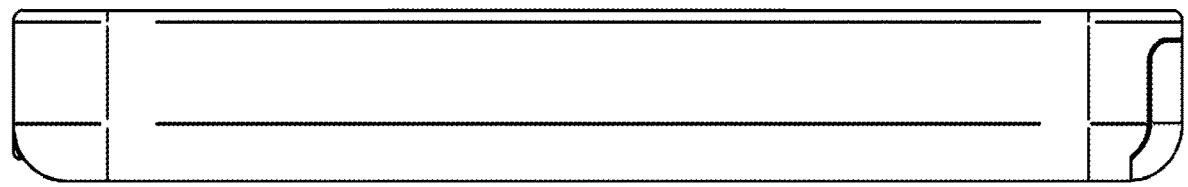

Sequencing through the figures starting at FIG. 9, it can be seen how some embodiments are directed at an analyte test meter 128. In some embodiments, the analyte test meter 128 may be constructed of constructed of metal, plastic, thermoplastic, photopolymers, powder-based materials, metal alloys, ceramics, composites or some combination thereof. In some embodiments, the analyte test meter 128 may be contained into a single meter housing 2101, which may have a rounded rectangular shape. In other aspects, the meter housing 2101 may utilize other shapes. For example, it may help the user to more easily grip a shape that contains and elongated rectangular body bound at either end by rounded edges.

To allow rapid, on-the-go testing, it may be advantageous for the analyte test meter 128 to house removable cartridges. In one embodiment, the removable biological test element 102, form factor contained, electro-operable biological test element 113, or the first removable, form factor contained, or electro-mechanical biological user element 119 may also comprise a test cartridge 123. In other embodiments, the biological sampler element 103, form factor contained, electro-mechanically controlled biological sampler 117, or second removable, form factor contained, electro-mechanical biological user element 121 may also comprise a lancing cartridge 124. In some embodiments, the test cartridge 123 may contain a plurality of removable biological test elements 102 and the lancing cartridge 124 may contain a plurality of biological sampler elements 103. In some embodiments, the test cartridge 123 and lancing cartridge 124 may be modular and fungible. For example, the user may use all of the removable biological test elements in a test cartridge 123, remove and discard the cartridge, and replace the cartridge with a new one. Similarly, the user may use all of the biological sampler elements in a lancing cartridge 124, remove and discard the cartridge, and replace the cartridge with a new one. In some embodiments, the cartridges 123, 124 may be constructed of metal, plastic, thermoplastic, photopolymers, powder-based materials, metal alloys, ceramics, composites or some combination thereof. For example, in certain embodiments, it may be advantageous for the cartridges 123, 124 to be constructed of entirely of recyclable material.

To give the user better control and visibility into the testing process, it may be advantageous for the test cartridge 123 and lancing cartridge 124 to connect to and communicate with the analyte test meter 128. In some embodiments, the test cartridge 123 and lancing cartridge 124 may communicate with the test receptacles 104, 105, 118, 120 through the biological test element information sensor 109 and the biological sample element information sensor 110. In other embodiments, the cartridges 123, 124 may communicate with the test processor 108, 112 through the use of pins, wires, contact points, radio frequencies, or some combination thereupon. In some embodiments, magnets placed on the cartridge 123, 124 and the meter housing 2101 or test receptacles 104, 105, 118, 120 may allow for a better user experience by keeping the cartridges securely in the right place, by increasing communication reliability, or both. For example, in one embodiment, the lancing cartridge 124 may contain a magnet or series of magnets 3200 designed to secure the cartridge 124 to the analyte test meter 128. In another example, the test cartridge 123 may contain a magnet or series of magnets 3200 designed to connect with magnets similarly positioned in the meter housing 2101. In other embodiments, the cartridges may be mated to the meter housing 2101 or test receptacles 104, 105, 118, 120 by mechanics, adhesive material, enclosure design or some combination thereon. To aid the user in accessing, securing, and removing the cartridges, in some embodiments, the analyte test meter 128 may contain recessed user access channels to allow the user to easily grip, remove and access the cartridges 123, 124. In some embodiments, the recessed user access channels may be cut into the meter housing. In other embodiments, the channel may extend out of the housing.

To allow the user greater control over the testing process, analyte test meter 128 may contain a number of user input features. For example, in some embodiments, the user may interact with the analyte test meter 128 through a series of user input features, including: (1) the use of a user test output 111 which may be a screen or touch screen; (2) a tactile button 126 which may be programmed to customize user input specifications; (3) a three-way switch to allow the user to manually enter and leave pre-defined device modes; (4) or some combination thereupon. Because the cartridges 123, 124 communicate with the analyte test meter 128, in some embodiments it may be advantageous for the user input features to inform the user when a cartridge 123, 124 is present, absent or improperly seated. In some embodiments, it may be useful to program a set of functions to the tactile button in order to more easily perform a variety of device functions, such as: (1) powering the device on and off; (2) waking the device from sleep mode; (3) resetting the device; (4) acting as a 'go back' or 'go home' button for the device bespoke UI; (5) activating the adjustable lancet selection mechanism 130; (6) activating the adjustable test strip driving mechanism 132; or (7) some combination thereon. For example, the user test output 111 may inform the user which biological test element 102 is contained in the test cartridge 123. In other embodiments, other user input features may allow for a greater degree of user control and customization around the lancing experience. For example, in one embodiment, the user test output 111 may permit the user to adjust speed and force applied to the biological sampler element 103.

To allow greater flexibility of when and where a user may perform desired tests, the analyte test meter 128 may be powered by a rechargeable battery. In some embodiments, the rechargeable battery may be charged through a USB-C interface, or electrical contact through pogo pins. Other embodiments may allow for other rechargeable options known in the art.

It may be advantageous for the lancing cartridge 124 to store and communicate certain important test information. For example, in one embodiment, the lancing cartridge 124 may store, modify save, and communicate certain information to the processor 108, 112. This information may include: (1) product serial number; (2) product manufacturing number; (3) date of manufacture; (4) gauge of the biological sampler element 103; (4) date and state of sterility for each biological sampler element 103; (5) how many biological sampler elements 103 remain sterile and unused; (6) which biological sampler elements 103 is in the active position; or (7) number of times each biological sampler elements 103 has been accessed by the user. For example, in one embodiment, the user may view detailed information about the lancing cartridge from the user test input 111.

In other embodiments, certain features may be important for maintaining user safety and the usability and sterility of testing materials. For example, in one embodiment, the lancing cartridge 124 may contain utilize a sterile film made of foil, plastic, rubber, or some other material to keep the biological sampler element 103 sterile. In other embodiments, the biological sampler element 103 may be contained entirely within the lancing cartridge 124 and may not be accessed or engaged other than through the use of one or more user inputs features. To further protect the biological sampler elements 103, in some embodiments the lancing cartridge 124 may contain ingress protection elements, such as rubber seals or electrically or mechanically operated openings to prevent cross contamination between biological sampler elements 103 and to ensure the elements remain sterile, in some embodiments, a protective seal 6001 may be added to either the opening in the cartridge or meter where the removable biological test elements 102 exit. Similarly, the test cartridge 123 may contain a number of element and user protection features. In some embodiments, ingress protection elements, such as rubber seals or electrically or mechanically operated openings may be used to protect the removable biological test elements 102. In other embodiments, the test cartridge 123 may contain certain elements to ensure the biological test elements 102 are kept in an environment with proper humidity and moisture. These elements may include desiccants, silica, beads, calcium chloride pellets, dry rice, activated charcoal, baking soda, or some combination thereof.

To ensure user safety and the continued integrity of test materials, it may be useful to lock access to test materials behind certain user inputs. For example, in one embodiment, the user test output 111 may require the user to complete a series of lancing safety steps designed to prevent the accidental engagement of the biological sampler elements 103. These lancing safety steps may include a series of swipes, clicks, or inputs from the user input features. In one embodiment, the analyte test meter 128 may permit the user to activate the biological sampler element 103 only when the lancing safety steps have been completed. It may also be useful to have this access limited to a certain predefined, customizable length of time. In some embodiments this may be 5 seconds, 10 seconds, 15 seconds, 30 seconds, 45 seconds, or 60 seconds. Thus, in some embodiments, completing the lancing safety steps may inform the processor 108, 112 to initiate a lancing timer, after which the device will disable use of the biological sampler elements 103. To give the user greater visibility into this timer, the user test output 111 may display the lancing timer to inform the user of when the enabled state will revert and may enable options to cancel or extend the lancing timer. Similarly, the user test output 111 may permit the user to customize how the biological sampler elements 103 are accessed. In one aspect, the user may modify the distance the biological sampler elements 103 travel by modifying the force applied to the biological sampler element 103 by the lancing device 129. In another aspect, the user may inform the processor 108, 112 to immediately activate the lancing device 129 when the tactile button 126 is engaged by the user. In another aspect, the user may inform the processor 108, 112 to initiate a countdown before activating the lancing device 129. This countdown may be displayed to the user on the user test output 111 and may be modified, extended or cancelled by the user. Further, in some embodiments, the user test output 111 may require the user to complete a series of test safety steps designed to prevent the accidental engagement of the removable biological test elements 102. These test safety steps may include a series of swipes, clicks, or inputs from the user input features. In one embodiment, the analyte test meter 128 may permit the user to activate the removable biological test element 102 once the test safety steps have been completed. In other embodiments, completing the test safety steps may inform the processor 108, 112 to initiate a testing timer, after which the device will disable use of the removable biological test element 102. In one embodiment, the user test output 111 may display the testing timer to inform the user of when the enabled state will revert and may enable options to cancel or extend the testing timer. In other embodiments, the user test output 111 may permit the user to customize how the removable biological test elements 102 are accessed. In one aspect, the user may modify the distance and speed of the removable biological test element 102 by adjusting the electric received by the lancing device 129. In another aspect, the user may inform the processor 108, 112 to immediately activate the removable biological test element 102 when the tactile button 126 is engaged by the user. In another aspect, the user may inform the processor 108, 112 to initiate a countdown before activating the removable biological test element 102. This countdown may be displayed to the user on the user test output 111 and may be modified, extended or cancelled by the user. In other embodiments, access to the lancing cartridge 124 or test cartridge 123 may be denied by an external preventative feature. In one embodiment, the external preventative feature may comprise a slide, cap, hinge, or some other method of shielding the biological sampler elements 103 and removable biological test elements 102. It may be useful to permit the external preventative feature to be manually engaged or disengaged by the user. In other embodiments, the external preventative feature may be engaged or disengaged by the processor 108, 112. In this embodiment, the user may inform the analyte test meter 128 when to remove the external preventative feature, the analyte test meter 128 may automatically remove the external preventative feature when the safety steps are completed, or some combination thereof.

To enhance the user experience and increase portability and the frequency of testing, it may be useful for the analyte test meter 128 to contain a lancing device 129. In some embodiments, the lancing device 129 may be a: (1) solenoid 137 with a solenoid plunger 138; (2) cam system; (3) motor; (4) series of gears; (5) manual user input; or (6) some combination thereof. In some embodiments, the lancing device may be used to apply a customizable level of force applied to the removable biological test element 102. This may be useful to allow greater customization to the lancing experience. In some embodiments, when the solenoid 137 is activated, the solenoid plunger 138 may drive forward and into the lancing cartridge 124, thereby engaging a custom lancet 131. In other embodiments, the lancing device may consist of a cam system which may include: (1) a cam motor 139 attached to a cam cylinder 140; (2) a cam channel 141 cut into and wrapped helically around the cylinder's 140 circumference; (3) a cam release cut vertically along the cylinder's 140 y-axis; and (4) a second cam cylinder 143 containing a cam insert 146 designed to fit and connect into the cam channel 141 and bound on one end by a cam plunger 144, and bound on the other end by a cam spring 145. In one embodiment, when the cam system is activated, the cam motor 139 rotates, forcing the cam cylinder 140 to rotate, thereby forcing the cam insert 146 to travel along the cam channel 141. This movement compresses the cam spring 145 until the cam insert 146 reaches the cam release, thereby driving the cam plunger 144 forward and into the lancing cartridge 124 and activating a custom lancet 131. In some embodiments, the processor 108, 112 may activate the lancing device after the user engages certain user input features.

To give the user a greater degree of control and customization over the lancing process, in some embodiments, the analyte test meter 128 may contain an adjustable lancet selection mechanism 130. In some embodiments, the adjustable lancet selection mechanism 130 may be responsive to the lancing device 129 and the lancing cartridge 124. For example, the adjustable lancet selection mechanism 130 may allow the user to select and use a biological sampler element 103 which may be a custom lancet 131. In one embodiment, the adjustable lancet selection mechanism 130 may be controlled by an adjustable gear wheel 133. For example, the user may select a desired custom lancet 131 through the use of the adjustable gear wheel 133. In other embodiments, the user may access custom lancets 131 without an adjustable gear wheel 133 by using an electric signal and a series of gears. In one embodiment, the adjustable lancet selection mechanism 130 may contain a gear cylinder 2600 bound on one end by a gear wheel 2107 and bound on the other end by a first gear 2601. As but one way to control movement, the teeth of the first gear 2601 interlock with a third gear 2603, revolving around shaft 2602, designed to connect to the lancing cartridge 124. In another embodiment, the adjustable lancet selection mechanism 130 may contain a lancet selection mechanism motor 2700 attached to a motor gear 2701, the teeth of which interlock with a third gear 2603 designed to connect to the lancing cartridge 124.

To give the user a greater degree of control and customization over the testing process, in some embodiments, the analyte test meter 128 may contain an adjustable test strip driving mechanism 132 which may be responsive to the test cartridge 123. As but one example, the adjustable test strip driving mechanism 132 may allow the user to select and eject a removable biological test element 102 through a test strip exit port 134 which may then allow the user to perform a biological test. In one embodiment, the adjustable test strip driving mechanism 132 may activate the test strip motor 4100, which turns the test strip wheel 4101, which turns the drive wheel 3708, when then advances a removable biological test element 102 through the test cartridge opening 3901 and then through test strip exit port 2200 which may be an opening in the meter housing for a removable biological test element 102 to exit. Such movement may be achieved through: other uses of motors, gears, solenoids, or other actuators, of course.

To ensure a quality lancing experience, several lancing cartridge 124 features may be useful. In one embodiment, the lancing cartridge 124 or test cartridge may contain top shell 2801 that can be securely fastened to a bottom shell 2803, between which a cylindrical lancing revolver 2802 may be securely held and also freely rotate around the z-axis. This may allow the adjustable lancet selection mechanism 130 to reliably access the desired lancet. A further embodiment may allow the cylindrical lancing revolver 2802 to contain a snap lock channel 2804 which may contain a series of indentations cut into sides of the cylindrical body and may be contained on both sides by lipped ridges. The top shell 2801 may contain a snap lock lever 2901 with an angled lip designed to lock into the snap lock channel 2804 and prevent the lancing revolver 2802 from rotating without the user intending it to. The top shell 2801 may further contain a series of revolver channels 2902 which may be semi-circle shaped indentions cut into surface and may be designed to receive and securely hold the lancing revolver 2802. The top shell 2801 may further contain a semi-circle shaped lipped ridge 2903 designed to hold the snap lock channel 2804 in proper position. Together, these embodiments prevent the accidental rotation or unintended selection of a lancet within the cartridge. In one embodiment, the bottom shell 2803 may contain a lancet cartridge exit port 3000 designed to allow the custom lancets 131 to temporarily extend through and beyond the lancing cartridge 124. In one embodiment, the bottom shell 2803 may contain a series of revolver channels 2902. The bottom shell 2803 may also contain a semi-circle shaped lipped ridge 2903 designed to hold the snap lock channel 2804 in proper position. The bottom shell may also contain a lipped ridge 3001 that allows the user to grip the lancing cartridge 124 and remove it from the meter housing 2101. The bottom shell may also contain a rotation port 3002 designed to receive a rotation insert 3400 to allow the lancing revolver 2802 to rotate freely around the z-axis while enclosed between the top shell 2801 and the bottom shell 2803. In one embodiment, the lancing revolver 2802 may be bound on one end by revolver cap 3101 that contains plurality of lancet chambers 3100 cut vertically into the revolver and spaced symmetrically around the circumference of the spherical surface. In one embodiment, custom lancets 131 may be entirely contained within the lancet chambers 3100. This may be useful to prevent unintended user injury or access to the custom lancets 131. In one embodiment, the top cap 3101 may contain a rotation chamber 3102 cut vertically through the center of the lancing revolver 2802 and revolver gear teeth 3103 spaced symmetrically around the edge of the spherical surface. In one embodiment, the lancing revolver 2802 may be bound on one end by the rotation chamber 3102 designed to receive a cylindrical insert 3401 from the meter housing 2101 and bound on the other end by a rotation insert 3400 designed to connect to a receiving slot in the bottom shell 2803. Together, the rotation chamber 3102 and the rotation insert 3400 allow the lancing revolver 2802 to rotate smoothly around the z-axis while securely contained within the top shell 2801 and the bottom shell 2803. In one embodiment, the snap lock lever 2901 may seat into the snap lock channel 2804 and prevents the lancing revolver 2802 from rotating without the user activating the lancing device 129 or the adjustable lancet selection mechanism 130.

To aid the user in selecting the correct lancet within the lancing cartridge 124, it may be useful to track the location of at least one lancet within the cartridge. Thus, in one embodiment, the lancing cartridge 124 may have a view window cut in the sides of the top shell 2801 and bottom shell 2803. The view window is designed to line up with a reading device positioned in the meter housing 2101. The reading device may comprise a rotary encoder, hall effect sensor, or some other device capable of reading the position of the lancing revolver 2802 within the lancing cartridge 2104. In one embodiment, the lancing revolver 2802 may contain a position identification system, which may consist of numbers, colors, dashes, dots, physical indentions, physical protrusions, or some combination thereon. In one embodiment, the reading device and the position identification system form the lancet position system, which may permit the user test output 111 to display certain custom lancet information. In one embodiment, the custom lancet information may include when a custom lancet 131 has already been used by the lancing device 129. In one embodiment, a user interchangeable, pocket-transportable form factor creating, biological blood test-based cartridge may have a plurality of deterministically reusable common event features. Here, individual features (such as lancets, strips, etc.) might be allowed to be reused if the user wants. Because reuse can present concerns, in some embodiments, the system, or custom lancet information, may act to warn or prevent the user from reusing used needles if/when appropriate.

To maintain a small, easily portable form-factor, in certain embodiments it may be useful to use custom lancets 131 in the lancing cartridge 124. In some embodiments, the custom lancets 131 may contain a lancing base 3300, a lancing spring 3301, and a sterile needle 3302. When the lancing device 126 is activated, the lancing base 3300 is pushed forward, compressing the lancing spring 3301, and sending the sterile needle 3302 through the lancet cartridge exit port 3000.

To ensure a quality testing experience, several test cartridge 123 features may be useful. In one embodiment, the test cartridge 123 may contain a plurality of removable biological test elements 102 held on one end by a first push plate 3700 and on the other end by a connector plate 3701 and a drive wheel 3708. In other embodiments, the test cartridge 123 may contain a first push plate 3700 and a second push plate 4900 to aid in the distribution of force applied to the removable biological test element 102. In one embodiment, push plates 3700, 4900 may contain one or more spring cutouts 3702 where a spring 3703 or other compressible material may enter the push plate and exert upward force to thereby increase the force that the removable biological test elements 102 compress against the connector plate 3701 and the drive wheel 3702. In one embodiment, the push plate 3700 may also contain a cutout 3704 on one or more of its sides to refocus or redistribute the force applied by the removable biological test elements 102 to the connector plate 3701 and the drive wheel 3708. In one embodiment, the test cartridge 123 may have a cartridge lip 3706 around the bottom edge or may have a seal space 3710 between the test cartridge 123 and the meter housing 2101 to allow a secure seal between the test cartridge 123 and the outside of the meter housing 2101. In one embodiment, the meter housing 2101 may contain a cartridge stop 3800 designed to securely receive the cartridge lip 3706. In one embodiment, the test cartridge 123 may contain a lipped ridge 3001 that allows the user to easily remove the cartridge from the meter housing 2101. In one embodiment, the meter housing 2101 may also contain a grip cutout 3801 that, in combination with the lipped ridge 3001, allow the user to easily remove the cartridge. In one embodiment, the test cartridge 123 may also contain channels 3802 that allow the connector plate 3701 to securely slide into position. In one embodiment, the test cartridge housing 3900 may have an opening 3901 where a removable biological test element 102 may be pushed, pulled, or otherwise removed from the test cartridge 123. This may also be an opening in the test cartridge 123 and other related embodiments for a removable biological test element 102 to exit. In one embodiment, the connector plate 3701 may have connector window through which a connector 3902 seated in the meter housing 2101 may send and receive signals to a removable biological test element 102. Of course, the connector plate 3701 and connector window may be combined in a manner that may eliminate the need for connector window altogether. In one embodiment, the connector 3902 may contain an electrical connector. Other embodiments may contain an optical sensor, a radio frequency transmitter and receiver, infrared communication, magnetic induction, conductive transmission, pneumatic transmission, or some combination thereof. In one embodiment, the drive wheel 3708 may contain a drive wheel axle 4000, around which a drive wheel bushing 4001 and a wheel 4002 may freely rotate. In one embodiment, the drive wheel bushing 4001 may contain ridges spaced symmetrically around the circumference to increase traction on the wheel 4002. In one embodiment, the wheel 4002 may be made of rubber. Other embodiments may include rubber, composites, silicone, other synthetic materials, or some combination thereupon. In one embodiment, the drive wheel 3708 may be located in the test cartridge 123. In another aspect, the drive wheel 3708 may be located inside the meter housing 2101 or in one of the device receptacles. In one embodiment, the adjustable test strip driving mechanism 132, may comprise a test strip motor 4100 and test strip wheel 4101. In some embodiments, it may be useful to allow the user to customize the speed, direction, or degrees of rotation of the test strip motor.

To allow multi-test capabilities, in some embodiments it may be useful for the test cartridge 123 may have a sensor window cut in the side of the cartridge housing. In some embodiments, the sensor window may be designed to line up with a sensing array positioned in the meter housing 2101. The sensing array may comprise one or more of the following: (1) an optical sensor; (2) photodetectors; (3) spectrophotometry emitters and receivers; (4) fluorometry emission; (5) chemiluminescence detection; (6) bioluminescence emission; (7) optical fiber sensors; (8) Raman spectroscopy; (9) reflectance spectroscopy; (10) surface plasmon resonance; and (11) light scattering techniques. Designs can have a connector window 5001, a sensing array 5002, and a sensing array connector 5003 as well.

To limit unintended use, it may be useful to restrict access to removable biological test elements 102. In one embodiment, the user test output 111 may require the user to complete a test sequence designed to prevent the accidental engagement of the removable biological test elements 102. This test sequence may include a series of swipes, clicks, or inputs from the user input features. For example, the user may be required to slide a bar across the user test output 111 and engage the tactile button 126 before the processor 108, 112 may activate the adjustable test strip driving mechanism 132. In other embodiments, the user may engage the user input features, complete the test sequence, or some combination thereof. In one embodiment, the analyte test meter 128 may permit the user to access the removable biological test element 102 once the test sequence has been completed. In one embodiment, completing the test sequence may inform the processor 108, 112 to initiate a test timer, after which the device will disable use of the adjustable test strip driving mechanism 132 and restrict access to the removable biological test element 102. In one embodiment, the user test output 111 may display the test timer to inform the user of when the enabled state will revert and may enable options to cancel or extend the test timer.

While the invention has been described in connection with some preferred embodiments, it is not intended to limit the scope of the invention to the particular form set forth, but on the contrary, it is intended to cover such alternatives, modifications, and equivalents as may be included within the spirit and scope of the invention as defined by the statements of inventions. Examples of alternative claims may include:

1. A user-friendly personal biological test system comprising:
    a single, multiple differential biological test receptacle having a biological element presence sensor;
    a removable, electronically activable, continuous pocket shaped exterior form factor creating, user interchangeable, biological blood test-based multiple glucose test event features smart cartridge configured to mate with and communicate with said single, multiple differential biological test receptacle;
    a removable, electronically activable, continuous pocket shaped exterior form factor creating, user interchangeable, biological blood test-based multiple A1C test event features smart cartridge configured to mate with and communicate with said single, multiple differential biological test receptacle;
    a single, biological sampler receptacle having a biological element presence sensor;
    a continuous pocket shaped exterior form factor creating, removable biological multiple blood sampler event features smart cartridge configured to mate with and communicate with said single biological sample receptacle;
    an automatically reconfigurable, substantially instantaneous analysis, multi-differential biological test processor that is automatically reconfigured in response to at least one of said biological test element sensors;
    a user test output responsive to said automatically reconfigurable, substantially instantaneous analysis, multi-differential biological test processor; and
    a fully contained, pocket-transportable, user biological test form factor configured to house said automatically reconfigurable, substantially instantaneous analysis, multi-differential biological test processor, said single multiple differential biological test receptacle, said single biological sampler receptacle, said user test output, said continuous pocket shaped exterior form factor creating, removable biological multiple blood sampler event features smart cartridge, and alternatively one of said removable, electronically activable, continuous pocket shaped exterior form factor creating, user interchangeable, biological blood test-based multiple glucose test event features cartridge or said removable, electronically activable, continuous pocket shaped exterior form factor creating, user interchangeable, biological blood test-based multiple A1C test event features cartridge.

2. A user-friendly personal biological test system as described in clause 1 or any other clause wherein said removable, electronically activable, continuous pocket shaped exterior form factor creating, user interchangeable, biological blood test-based multiple glucose test event features smart cartridge, said removable, electronically activable, continuous pocket shaped exterior form factor creating, user interchangeable, biological blood test-based multiple A1C test event features smart cartridge, and said continuous pocket shaped exterior form factor creating, removable biological multiple blood sampler event features smart cartridge each comprise a smart biological blood test-based element chosen from at least one of:
 a reporting capable biological blood test-based element,
 a memory capable biological blood test-based element,
 a communication capable biological blood test-based element,
 a biological element manufacture information containing biological blood test-based element,
 a biological element multiple common feature information containing biological blood test-based element,
 a biological element expiration information containing biological blood test-based element,
 a biological element number of uses information containing biological blood test-based element,
 a biological element number of multiple common features information containing biological blood test-based element,
 a biological element recency of use information containing biological blood test-based element,
 a biological element time of use information containing biological blood test-based element, and
 a biological element time since last use information containing biological blood test-based element.

3. A user-friendly personal biological test system as described in clause 2 or any other clause wherein said removable, electronically activable, continuous pocket shaped exterior form factor creating, user interchangeable, biological blood test-based multiple glucose test event features smart cartridge, said removable, electronically activable, continuous pocket shaped exterior form factor creating, user interchangeable, biological blood test-based multiple A1C test event features smart cartridge, and said continuous pocket shaped exterior form factor creating, removable biological multiple blood sampler event features smart cartridge each comprise an electro-mechanically sequenced biological blood test-based cartridge.

4. A user-friendly personal biological test system as described in clause 3 or any other clause wherein said continuous pocket shaped exterior form factor creating, removable biological multiple blood sampler event features smart cartridge comprises a plurality of deterministically reusable common event features.

5. A user-friendly personal biological test system as described in clause 1 or any other clause wherein said automatically reconfigurable, substantially instantaneous analysis, multi-differential biological test processor comprises a pre-stored software routine selectable multi-differential biological test processor.

6. A user-friendly personal biological test system as described in clause 1 or any other clause wherein said automatically reconfigurable, substantially instantaneous analysis, multi-differential biological test processor comprises an automatic sensor-deterministically configured multi-differential biological test processor.

7. A user-friendly personal biological test system as described in clause 1 or any other clause wherein a first exterior part of said fully contained, pocket-transportable, user biological test form factor comprises a first removable cartridge surface, and wherein a second exterior part of said fully contained, pocket-transportable, user biological test form factor comprises a second removable cartridge surface.

8. A user-friendly personal biological test system as described in clause 7 or any other clause wherein said fully contained, pocket-transportable, user biological test form factor comprises a smart phone shaped fully contained, pocket-transportable, user biological test form factor.

9. A user-friendly personal biological test system as described in clause 1 or any other clause and further comprising:
 a user sampler configuration selector capable of inputting a user sampling selection;
 a sampler selection efficacy analyzer to which said automatically reconfigurable, substantially instantaneous analysis, multi-differential biological test processor is responsive, and configured to automatically disable operation of said continuous pocket shaped exterior form factor creating, removable biological multiple blood sampler event features smart cartridge when said user sampling selection is determined to be unacceptable.

10. A user-friendly personal biological test system as described in clause 9 or any other clause wherein said automatically reconfigurable, substantially instantaneous analysis, multi-differential biological test processor comprises a computationally decisionally-based user programmable movement element.

11. A user-friendly personal biological test system as described in clause 10 or any other clause wherein said user sampler configuration selector comprises a user reconfigurable common feature repetition selector.

12. A user-friendly personal biological test system as described in clause 10 or any other clause and further comprising: a test safety disable element; and a user reselection prompt.

13. A user-friendly personal biological test system comprising:
 a substantially instantaneous analysis biological test processor;
 a first biological action receptacle to which said substantially instantaneous analysis biological test processor is responsive;
 a first removable, form factor contained, electro-mechanical multiple test event features smart cartridge configured to mate with said first biological action receptacle;
 a second biological action receptacle to which said substantially instantaneous analysis biological test processor is responsive;
 a second removable, form factor contained, electro-mechanical multiple test event features smart cartridge configured to mate with said second biological action receptacle;
 a user test output responsive to said substantially instantaneous analysis biological test processor; and
 a fully contained, pocket-transportable user biological test form factor configured to house said substantially instantaneous analysis biological test processor, said first biological action receptacle, said first removable form factor contained, electro-mechanical biological user element, said second biological action receptacle, said second removable, form factor contained, electro-mechanical biological user element, and said user test output within said pocket-transportable form factor,
and wherein a first exterior part of said fully contained, pocket-transportable, user biological test form factor comprises a first removable cartridge surface, and wherein a second exterior part of said fully contained, pocket-transportable, user biological test form factor comprises a second removable cartridge surface.

14. A user-friendly personal biological test system as described in clause 13 or any other clause and further comprising a removable biological test element sensor, and wherein said substantially instantaneous analysis biological test processor comprises an automatically reconfigurable, substantially instantaneous analysis, multi-differential biological test processor that is automatically reconfigured in response to said removable biological test element sensor.

15. A user-friendly personal biological test system as described in clause 14 or any other clause and further comprising a user sampler configuration selector capable of inputting a user sampling selection.

16. A user-friendly personal biological test system as described in clause 15 or any other clause and further comprising a sampler selection efficacy analyzer.

17. A user-friendly personal biological test system as described in clause 16 or any other clause and further comprising a test disable element.

18. A user-friendly personal biological test system as described in clause 17 or any other clause wherein said test disable element comprises a test disable-when-user-selection inappropriate element.

19. A user-friendly personal biological test system comprising:
- a first electronically activable, first sense modality element configured for a first particular biological test type;
- a second electronically activable, second sense modality element configured for a second particular biological test type;
- a single, multiple differential biological test receptacle having a biological test element information sensor;
- at least one removable biological test element configured to mate with said single multiple differential biological test receptacle, configured for one of said first particular biological test type or second particular biological test type, and configured to communicate with said single, multiple differential biological test receptacle;
- a single biological sampler receptacle having a biological sample element information sensor;
- at least one removable biological sampler element configured to mate with said single biological sample receptacle, configured to acquire a desired sample for a biological test, and configured to communicate with said single biological sample receptacle;
- an automatically reconfigurable, substantially instantaneous analysis, multi-differential biological test processor capable of selectively responding to said first electronically activable, first sense modality element and said second electronically activable, second sense modality element, responsive to said biological test element information sensor and said biological sample element information sensor, and that is automatically reconfigured in response to said biological test element sensor;
- a user test output responsive to said automatically reconfigurable, substantially instantaneous analysis, multi-differential biological test processor; and
- a fully contained, pocket-transportable, user biological test form factor configured to house said automatically reconfigurable, substantially instantaneous analysis, multi-differential biological test processor, said single multiple differential biological test receptacle, said removable biological test element, said single biological sample receptacle, said removable biological sampler element, and said user test output within said fully contained, pocket-transportable, user biological test form factor.

20. A user-friendly personal biological test system as described in clause 19 or any other clause wherein said first electronically activable, first sense modality element comprises an electronically activable glucose test element.

21. A user-friendly personal biological test system as described in clause 19 or any other clause wherein said first electronically activable, first sense modality element comprises a selectively electronically activable computer routine configured to determine a user's glucose level.

22. A user-friendly personal biological test system as described in clause 19 or any other clause wherein said second electronically activable, second sense modality element comprises an electronically activable A1C test element.

23. A user-friendly personal biological test system as described in clause 19 or any other clause wherein said second electronically activable, second sense modality element comprises a selectively electronically activable computer routine configured to determine a user's A1C level.

24. A user-friendly personal biological test system as described in clause 19 or any other clause wherein said second electronically activable, second sense modality element comprises an electronically activable ketone test element.

25. A user-friendly personal biological test system as described in clause 19 or any other clause wherein said second electronically activable, second sense modality element comprises a selectively electronically activable computer routine configured to determine a user's ketone level.

26. A user-friendly personal biological test system as described in clause 19 or any other clause and further comprising a third electronically activable, third sense modality element.

27. A user-friendly personal biological test system as described in clause 26 or any other clause wherein said third electronically activable, third sense modality element comprises an electronically activable ketone test element.

28. A user-friendly personal biological test system as described in clause 26 or any other clause wherein said third electronically activable, third sense modality element comprises a selectively electronically activable computer routine configured to determine a user's ketone level.

29. A user-friendly personal biological test system as described in clause 19 or any other clause wherein said single, multiple differential biological test receptacle comprises a single, multiple differential biological test receptacle having a biological element presence sensor.

30. A user-friendly personal biological test system as described in clause 19 or any other clause wherein said single biological sampler receptacle comprises a single, multiple differential biological sampler receptacle having a biological element presence sensor.

31. A user-friendly personal biological test system as described in clause 29, 30, or any other clause wherein said biological test element information sensor comprises a device on-board activable software subroutine.

32. A user-friendly personal biological test system as described in clause 29, 30, or any other clause wherein said biological element presence sensor comprises a device-contained different sense modality need subroutine.

33. A user-friendly personal biological test system as described in clause 29, 30, or any other clause wherein said biological element presence sensor comprises an on-board software routine configured to sense the presence of a removable biological element.

34. A user-friendly personal biological test system as described in clause 29, 30, or any other clause wherein said biological element presence sensor comprises a biological element test type sensor.

35. A user-friendly personal biological test system as described in clause 29, 30, or any other clause wherein said biological test element information sensor or said biological sample element information sensor comprise a biological information sensor chosen from at least one of:
- a biological element manufacture information sensor,
- a biological element multiple common feature information sensor,
- a biological element expiration information sensor,
- a biological element number of uses information sensor,
- a biological element number of multiple common features information sensor,
- a biological element recency of use information sensor,
- a biological element time of use information sensor, and
- a biological element time since last use information sensor.

36. A user-friendly personal biological test system as described in clause 19 or any other clause wherein said single, multiple differential biological test receptacle comprises a combined glucose test-capable test receptacle and A1C test-capable biological test receptacle.

37. A user-friendly personal biological test system as described in clause 36 or any other clause wherein said single, multiple differential biological test receptacle further comprises a combined glucose test-capable test receptacle, A1C test-capable biological test receptacle, and ketone test-capable biological test receptacle.

38. A user-friendly personal biological test system as described in clause 19 or any other clause wherein said removable biological test element comprises a removable biological blood procedure element, and wherein said removable biological sampler element comprises a removable biological blood procedure element.

39. A user-friendly personal biological test system as described in clause 38 or any other clause wherein said removable biological blood test element comprises a removable glucose test element.

40. A user-friendly personal biological test system as described in clause 39 or any other clause wherein said removable biological blood test element can also comprise a removable A1C test element.

41. A user-friendly personal biological test system as described in clause 40 or any other clause wherein said removable biological blood test element can also comprise a removable ketone test element.

42. A user-friendly personal biological test system as described in clause 19 or any other clause wherein said removable biological test element comprises a blood test-based element.

43. A user-friendly personal biological test system as described in clause 19 or any other clause wherein said removable biological sampler element comprises a blood test-based element.

44. A user-friendly personal biological test system as described in clause 19 or any other clause wherein said removable biological test element comprises at least one electrochemical test strip.

45. A user-friendly personal biological test system as described in clause 19 or any other clause wherein said removable biological sampler element comprises at least one lancet.

46. A user-friendly personal biological test system as described in clause 42, 43, or any other clause wherein said blood test-based element comprises at least one smart biological blood test-based element.

47. A user-friendly personal biological test system as described in clause 47 or any other clause wherein said smart biological blood test-based element comprises a smart biological blood test-based element chosen from at least one of:
- a self-monitoring capable biological blood test-based element,
- an analysis capable biological blood test-based element,
- a reporting capable biological blood test-based element,
- a memory capable biological blood test-based element,
- a sensing capable biological blood test-based element,
- a communication capable biological blood test-based element,
- another device interfacing capable biological blood test-based element,
- a computation capable biological blood test-based element,
- an information capable biological blood test-based element,
- an intelligence capable biological blood test-based element,
- an artificial intelligence capable biological blood test-based element,
- an adaptive capable biological blood test-based element.

48. A user-friendly personal biological test system as described in clause 46 or any other clause wherein said smart biological test element comprises a biological blood test information containing biological blood test-based element.

49. A user-friendly personal biological test system as described in clause 42, 43 or any other clause wherein said smart biological blood test-based element comprises a pocket-transportable device, continuous pocket shaped exterior form factor creating, biological blood test-based cartridge.

50. A user-friendly personal biological test system as described in clause 49 or any other clause wherein said pocket-transportable device, continuous pocket shaped exterior form factor creating, biological blood test-based cartridge comprises a user interchangeable biological blood test-based cartridge.

51. A user-friendly personal biological test system as described in clause 50 or any other clause wherein said user interchangeable biological blood test-based cartridge comprises a user interchangeable multiple common test features cartridge.

52. A user-friendly personal biological test system as described in clause 51 or any other clause wherein said user interchangeable multiple common test features cartridge comprises an electro-mechanically sequenced biological blood test-based cartridge.

53. A user-friendly personal biological test system as described in clause 52 or any other clause wherein said electro-mechanically sequenced biological blood test-based cartridge comprises a plurality of automatic differential test setting user interchangeable biological blood test-based cartridges.

54. A user-friendly personal biological test system as described in clause 42, 43 or any other clause wherein said blood test-based element comprises a pocket-transportable form factor-creating biological blood test-based cartridge.

55. A user-friendly personal biological test system as described in clause 54 or any other clause wherein said pocket-transportable form factor-creating biological blood test-based cartridge comprises a user interchangeable, pocket-transportable form factor creating, biological blood test-based cartridge.

56. A user-friendly personal biological test system as described in clause 55 or any other clause wherein said user interchangeable, pocket-transportable form factor creating, biological blood test-based cartridge comprises a plurality of different biological test cartridges each capable of creating a substantially similar pocket-transportable form factor.

57. A user-friendly personal biological test system as described in clause 55 or any other clause wherein said user interchangeable, pocket-transportable form factor creating, biological blood test-based cartridge comprises a multiple common event features contained within said user interchangeable, pocket-transportable form factor creating, biological blood test-based cartridge.

58. A user-friendly personal biological test system as described in clause 57 or any other clause wherein said multiple common event features comprise multiple automatically sequenced common event features configured to be sequenced within said user interchangeable, pocket-transportable form factor creating, biological blood test-based cartridge.

59. A user-friendly personal biological test system as described in clause 58 or any other clause wherein said multiple automatically sequenced common event features comprise a readably, electro-mechanically sequenced stack of common event features within said user interchangeable, pocket-transportable form factor creating, biological blood test-based cartridge.

60. A user-friendly personal biological test system as described in clause 58 or any other clause wherein said multiple automatically sequenced common event features comprise an electro-mechanically sequenced revolver of common event features within said user interchangeable, pocket-transportable form factor creating, biological blood test-based cartridge.

61. A user-friendly personal biological test system as described in clause 60 or any other clause wherein said electro-mechanically sequenced revolver of common event features within said user interchangeable, pocket-transportable form factor creating, biological blood test-based cartridge comprises a plurality of deterministically reusable common event features.

62. A user-friendly personal biological test system as described in clause 19 or any other clause wherein said automatically reconfigurable, substantially instantaneous analysis, multi-differential biological test processor comprises an automatically reconfigurable, substantially instantaneous analysis, multi-differential biological test processor configured to provide analysis results in not more than about 60 seconds.

63. A user-friendly personal biological test system as described in clause 19 or any other clause wherein said automatically reconfigurable, substantially instantaneous analysis, multi-differential biological test processor comprises an automatically reconfigurable, substantially instantaneous analysis, multi-differential biological test processor configured to provide analysis results in not more than about 15 seconds.

64. A user-friendly personal biological test system as described in clause 19 or any other clause wherein said automatically reconfigurable, substantially instantaneous analysis, multi-differential biological test processor comprises an automatically reconfigurable, substantially instantaneous analysis, multi-differential biological test processor configured to provide analysis results in not more than about 5 seconds.

65. A user-friendly personal biological test system as described in clause 19 or any other clause wherein said automatically reconfigurable, substantially instantaneous analysis, multi-differential biological test processor comprises a pre-stored software routine selectable multi-differential biological test processor.

66. A user-friendly personal biological test system as described in clause 19 or any other clause wherein said automatically reconfigurable, substantially instantaneous analysis, multi-differential biological test processor comprises an automatic sensor-deterministically configured multi-differential biological test processor.

67. A user-friendly personal biological test system as described in clause 66 or any other clause wherein said automatic sensor-deterministically configured multi-differential biological test processor comprises a cartridge presence sensor-deterministically configured multi-differential biological test processor.

68. A user-friendly personal biological test system as described in clause 53 or any other clause wherein said automatic sensor-deterministically configured multi-differential biological test processor comprises a reconfigurable multi-differential biological test processor configured to be automatically reconfigurationally responsive to said plurality of automatic differential test setting user interchangeable biological blood test-based cartridges.

69. A user-friendly personal biological test system as described in clause 19 or any other clause wherein said user test output comprises a user communication display.

70. A user-friendly personal biological test system as described in clause 69 or any other clause wherein said user communication display comprises a user directive display.

71. A user-friendly personal biological test system as described in clause 70 or any other clause wherein said user directive display also comprises a user input accommodative display.

72. A user-friendly personal biological test system as described in clause 19 or any other clause wherein said fully contained, pocket-transportable, user biological test form factor comprises a fully contained, pocket-transportable, user biological test form factor having a diagonal dimension as measured from opposite corners of less than or equal to about 4.6 inches.

73. A user-friendly personal biological test system as described in clause 19 or any other clause wherein said fully contained, pocket-transportable, user biological test form factor comprises a fully contained, pocket-transportable, user biological test form factor having a diagonal dimension as measured from opposite corners of less than or equal to about 12 cm.

74. A user-friendly personal biological test system as described in clause 19 or any other clause wherein said fully contained, pocket-transportable, user biological test form factor comprises a fully contained, pocket-transportable, user biological test form factor having a diagonal dimension as measured from opposite corners of less than or equal to about 6 inches.

75. A user-friendly personal biological test system as described in clause 19 or any other clause wherein said fully contained, pocket-transportable, user biological test form factor comprises a fully contained, pocket-transportable, user biological test form factor having a diagonal dimension as measured from opposite corners of less than or equal to about 20 cm.

76. A user-friendly personal biological test system as described in clause 19 or any other clause wherein said fully contained, pocket-transportable, user biological test form factor comprises a smart phone sized fully contained, pocket-transportable, user biological test form factor.

77. A user-friendly personal biological test system as described in clause 19 or any other clause wherein said fully contained, pocket-transportable, user biological test form factor comprises a fully contained, pocket-transportable, user biological test form factor having a thickness of less than or equal to about 0.6 inch.

78. A user-friendly personal biological test system as described in clause 19 or any other clause wherein said fully contained, pocket-transportable, user biological test form factor comprises a fully contained, pocket-transportable, user biological test form factor having a thickness of less than or equal to about 1 cm.

79. A user-friendly personal biological test system as described in clause 19 or any other clause wherein said fully contained, pocket-transportable, user biological test form factor comprises a fully contained, pocket-transportable, user biological test form factor having a thickness of about one inch.

80. A user-friendly personal biological test system as described in clause 19 or any other clause wherein said fully contained, pocket-transportable, user biological test form factor comprises a fully contained, pocket-transportable, user biological test form factor having a thickness of about 2 cm.

81. A user-friendly personal biological test system as described in clause 19 or any other clause wherein said fully contained, pocket-transportable, user biological test form factor comprises a six exterior-sided fully contained, pocket-transportable, user biological test form factor.

82. A user-friendly personal biological test system as described in clause 81 or any other clause wherein at least part of said six exterior-sided fully contained, pocket-transportable, user biological test form factor comprises a removable element surface.

83. A user-friendly personal biological test system as described in clause 81 or any other clause wherein a first exterior part of said six exterior sided fully contained, pocket-transportable, user biological test form factor comprises a first removable cartridge surface, and wherein a second exterior part of said six exterior sided fully contained, pocket-transportable, user biological test form factor comprises a second removable cartridge surface.

84. A user-friendly personal biological test system as described in clause 81 or any other clause wherein said pocket shaped comprises a smart phone shaped fully contained, pocket-transportable, user biological test form factor.

85. A user-friendly personal biological test system as described in clause 19 or any other clause wherein said fully contained, pocket-transportable, user biological test form factor comprises an aesthetically shaped fully contained, pocket-transportable, user biological test form factor.

86. A user-friendly personal biological test system comprising:
   a substantially instantaneous analysis biological test processor;
   a biological test receptacle to which said substantially instantaneous analysis biological test processor is responsive;
   a form factor contained, electro-operable biological test element configured for a particular biological test, and configured to mate with said biological test receptacle;
   a biological sampler receptacle to which said substantially instantaneous analysis biological test processor is responsive;
   a user sampler configuration selector capable of inputting a user sampling selection;
   an electro-mechanical, user-personalizable, biological sampler control processor responsive to said user sampler configuration selector;
   a sampler selection efficacy analyzer to which said electro-mechanical, user-personalizable biological sampler control processor is responsive, and configured to automatically disable operation of said form factor contained, electro-mechanically controlled biological sampler when said user sampling selection is determined to be unacceptable;
   a form factor contained, electro-mechanically controlled biological sampler configured to acquire a desired sample for said particular biological test in accordance with instructions from said electro-mechanical, user-personalizable biological sampler control processor;
   a user test output responsive to said substantially instantaneous analysis biological test processor; and
   a fully contained, pocket-transportable user biological test form factor configured to house said substantially instantaneous analysis biological test processor, said biological test receptacle, said form factor contained, electro-operable biological test element, said biological sample receptacle, said form factor contained, electro-mechanically controlled biological sampler, said electro-operable user sampler configuration selector, said user-personalizable biological sampler control processor, said sampler selection efficacy analyzer, and said user test output within said pocket-transportable form factor.

87. A user-friendly personal biological test system as described in clause 86 or any other clause wherein said form factor contained, electro-operable biological test element comprises a portable device on-board software-controlled movement biological test element.

88. A user-friendly personal biological test system as described in clause 86 or any other clause wherein said form factor contained, electro-mechanically controlled biological sampler comprises a portable device on-board software-controlled movement biological sampler element.

89. A user-friendly personal biological test system as described in clause 87, 88 or any other clause wherein said substantially instantaneous analysis biological test processor comprises a user programmable movement element.

90. A user-friendly personal biological test system as described in clause 87, 88 or any other clause wherein said substantially instantaneous analysis biological test processor comprises a computationally decisionally-based user programmable movement element.

91. A user-friendly personal biological test system as described in clause 89 or any other clause wherein said substantially instantaneous analysis biological test processor comprises a user reprogrammable biological sampler movement element.

92. A user-friendly personal biological test system as described in clause 86 or any other clause wherein said user sampler configuration selector comprises a user reconfigurable sampler action timing selector.

93. A user-friendly personal biological test system as described in clause 86 or any other clause wherein said user sampler configuration selector comprises a user reconfigurable sampler action strength selector.

94. A user-friendly personal biological test system as described in clause 86 or any other clause wherein said user sampler configuration selector comprises a user reconfigurable common feature repetition selector.

95. A user-friendly personal biological test system as described in clause 86 or any other clause wherein said electro-mechanical, user-personalizable, biological sampler control processor comprises a user reprogrammable biological sampler control processor responsive to said user sampler configuration selector and said sampler selection efficacy analyzer.

96. A user-friendly personal biological test system as described in clause 86 or any other clause wherein said sampler selection efficacy analyzer comprises a user selection safety analyzer.

97. A user-friendly personal biological test system as described in clause 96 or any other clause wherein said user selection safety analyzer comprises a: test safety disable element; and a user reselection prompt.

98. A user-friendly personal biological test system as described in clause 86 or any other clause wherein said sampler selection efficacy analyzer comprises a: test safety disable element; and a user cartridge action prompt.

99. A user-friendly personal biological test system as described in clause 86 or any other clause wherein said sampler selection efficacy analyzer further comprises a test initiation safety analyzer.

100. A user-friendly personal biological test system as described in clause 86 or any other clause wherein said test initiation safety analyzer comprises an inserted cartridge information analyzer.

101. A user-friendly personal biological test system comprising:
   a substantially instantaneous analysis biological test processor;
   a first biological action receptacle to which said substantially instantaneous analysis biological test processor is responsive;
   a first removable, form factor contained, electro-mechanical biological user element configured to mate with said first biological action receptacle;
   a second biological action receptacle to which said substantially instantaneous analysis biological test processor is responsive;
   a second removable, form factor contained, electro-mechanical biological user element configured to mate with said second biological action receptacle;
   a user test output responsive to said substantially instantaneous analysis biological test processor; and
   a fully contained, pocket-transportable user biological test form factor configured to house said substantially instantaneous analysis biological test processor, said first biological action receptacle, said first removable form factor contained, electro-mechanical biological user element, said second biological action receptacle, said second removable, form factor contained, electro-mechanical biological user element, and said user test output within said pocket-transportable form factor.

102. A user-friendly personal biological test system as described in clause 101 or any other clause wherein at least one of said removable, form factor contained, electro-mechanical biological user elements comprises multiple common event features contained within said biological user element.

103. A user-friendly personal biological test system as described in clause 102 or any other clause wherein said multiple common event features comprise multiple automatically sequenced common event features configured to be sequenced within said biological user element.

104. A user-friendly personal biological test system as described in clause 101 or any other clause wherein said fully contained, pocket-transportable user biological test form factor comprises a smart phone sized fully contained, pocket-transportable, user biological test form factor.

105. A user-friendly personal biological test system as described in clause 101 or any other clause wherein said fully contained, pocket-transportable user biological test form factor comprises a six exterior-sided fully contained, pocket-transportable, user biological test form factor.

106. A user-friendly personal biological test system as described in clause 105 or any other clause wherein at least part of said six exterior-sided fully contained, pocket-transportable, user biological test form factor comprises a removable element surface.

107. A user-friendly personal biological test system as described in clause 105 or any other clause wherein a first exterior part of said six exterior sided fully contained, pocket-transportable, user biological test form factor comprises a first removable cartridge surface, and wherein a second exterior part of said six exterior sided fully contained, pocket-transportable, user biological test form factor comprises a second removable cartridge surface.

108. A user-friendly personal biological test system as described in clause 105 or any other clause wherein said six exterior-sided fully contained, pocket-transportable, user biological test form factor comprises a smart phone shaped fully contained, pocket-transportable, user biological test form factor.

109. A user-friendly personal biological test system as described in clause 101 or any other clause wherein said fully contained, pocket-transportable user biological test form factor comprises an aesthetically shaped fully contained, pocket-transportable, user biological test form factor.

110. A user-friendly personal biological test system as described in clause 101 or any other clause wherein said substantially instantaneous analysis biological test processor comprises an automatically reconfigurable, substantially instantaneous analysis, multi-differential biological test processor capable of selectively responding to said first electronically activable, first sense modality element and said second electronically activable, second sense modality element, responsive to said biological test element information sensor and said biological sample element information sensor, and that is automatically reconfigured in response to said removable biological test element sensor.

111. A user-friendly personal biological test system as described in clause 101 or any other clause and further comprising a user sampler configuration selector capable of inputting a user sampling selection.

112. A user-friendly personal biological test system as described in clause 101 or any other clause and further comprising a sampler selection efficacy analyzer to which said electro-mechanical, user-personalizable biological sampler control processor is responsive, and configured to automatically disable operation of said form factor contained, electro-mechanically controlled biological sampler when said user sampling selection is determined to be unacceptable;

113. A user-friendly personal biological test system as described in clause 19, 86, 101 or any other clause and further comprising a test disable element.

114. A user-friendly personal biological test system as described in clause 113 or any other clause wherein said test disable element comprises a test disable-when-user-selection inappropriate element.

115. A user-friendly personal biological test system as described in clause 114 or any other clause wherein said test disable-when-user-selection inappropriate element comprises a test disable-when-user-selection inappropriate element chosen from at least one of:
   a cartridge presence-based disable element,
   a cartridge date-based disable element,
   a cartridge expiration date-based disable element,
   a cartridge prior use-based disable element, and
   a cartridge time of use-based disable element.

116. A process for user-friendly personal biological testing comprising the steps of:
- establishing an automatically reconfigurable, substantially instantaneous analysis, multi-differential biological test processor having a first electronically activable, first sense modality element configured for a first particular biological test type and a second electronically activable, second sense modality element configured for a second particular biological test type;
- automatically selecting a particular biological test modality to perform through operation of said automatically reconfigurable, substantially instantaneous analysis, multi-differential biological test processor;
- automatically configuring said automatically reconfigurable, substantially instantaneous analysis, multi-differential biological test processor for said selected particular biological test modality;
- conducting said biological test from said pocket-transportable, user biological test form factor; and
- outputting a user test output responsive to said substantially instantaneous analysis biological test processor from said pocket-transportable, user biological test form factor.

117. A process for user-friendly personal biological testing comprising the steps of:
- establishing a substantially instantaneous analysis biological test processor for biological testing fully contained within a pocket-transportable, user biological test form factor;
- providing a biological test receptacle to which said substantially instantaneous analysis biological test processor is responsive;
- inserting a form factor contained, electro-operable biological test element into said biological test receptacle;
- providing a biological sampler receptacle to which said substantially instantaneous analysis biological test processor is responsive;
- inserting a form factor contained, electro-mechanical biological sampler element into said biological sampler receptacle;
- allowing a user sampler configuration selection;
- efficacy analyzing said user sampler configuration selection;
- controlling said electro-mechanical biological sampler element in response to said step of efficacy analyzing said user sampler configuration selection;
- conducting said biological test from said pocket-transportable, user biological test form factor; and
- outputting a user test output responsive to said substantially instantaneous analysis biological test processor from said pocket-transportable, user biological test form factor.

118. A process for user-friendly personal biological testing comprising the steps of:
- establishing a substantially instantaneous analysis biological test processor for biological testing fully contained within a pocket-transportable, user biological test form factor;
- providing a first biological action receptacle to which said substantially instantaneous analysis biological test processor is responsive;
- inserting a first removable, form factor contained, electro-operable biological user element into said first biological action receptacle;
- providing a second biological action receptacle to which said substantially instantaneous analysis biological test processor is responsive;
- inserting a second removable, form factor contained, electro-mechanical biological user element into said second biological action receptacle;
- conducting said biological test from said pocket-transportable, user biological test form factor; and
- outputting a user test output responsive to said substantially instantaneous analysis biological test processor from said pocket-transportable, user biological test form factor.

As can be easily understood from the foregoing, the basic concepts of the various embodiments of the present invention(s) may be embodied in a variety of ways. It involves both testing techniques as well as devices to accomplish the appropriate test. In this application, the testing techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the invention(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives.

Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application.

It should also be understood that a variety of changes may be made without departing from the essence of the various embodiments of the invention(s). Such changes are also implicitly included in the description. They still fall within the scope of the various embodiments of the invention(s). A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the invention(s) both independently and as an overall system.

Further, each of the various elements of the embodiments of the invention(s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the invention(s), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the invention(s) is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "test" should be understood to encompass disclosure of the act of "testing"—whether explicitly discussed or not—and, conversely, were there effectively disclosure of the act of "testing", such a disclosure should be understood to encompass disclosure of a "test" and even a "means for testing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components, programming, subroutines, logic, or elements that are configured to, or configured and arranged to, provide or even achieve a particular result, use, purpose, situation, function, or operation, or as components that are capable of achieving a particular activity, result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of the various embodiments of invention(s) such statements are expressly not to be considered as made by the applicant(s).

References to be Incorporated by Reference

| US patents | |
|---|---|
| Pat. No. | Patentee |
| U.S. Pat. No. 7,811,236 B2 | List et al. |
| U.S. Pat. No. 9,226,699 B2 | Freeman et al. |
| U.S. Pat. No. 9,186,097 B2 | Frey et al. |
| U.S. Pat. No. 10,034,628 B2 | Freeman et al. |
| U.S. Pat. No. 9,820,684 B2 | Freeman et al. |
| U.S. Pat. No. 9,775,553 B2 | Freeman et al. |
| U.S. Pat. No. 9,226,699 B2 | Freeman et al. |
| U.S. Pat. No. 8,965,476 B2 | Freeman et al. |
| U.S. Pat. No. 8,961,431 B2 | Roe et al. |
| U.S. Pat. No. 8,696,597 B2 | Neel et al. |
| U.S. Pat. No. 8,636,675 B2 | Hein et al. |
| U.S. Pat. No. 8,262,614 B2 | Freeman et al. |
| U.S. Pat. No. 8,231,645 B2 | List |
| U.S. Pat. No. 7,833,172 B2 | Hein et al. |
| U.S. Pat. No. 7,811,236 B2 | List et al. |
| U.S. Pat. No. 7,150,755 B2 | Levaughn et al. |
| U.S. Pat. No. 7,566,419 B2 | Schulat et al. |
| U.S. Pat. No. 7,883,473 B2 | LeVaughn et al. |
| U.S. Pat. No. 8,435,447 | Bryer et al. |
| U.S. Pat. No. 8,556,827 B2 | Mace |
| U.S. Pat. No. 8,718,952 | Matievich, Jr. et al. |
| U.S. Pat. No. 8,870,903 B2 | Levaughn et al. |
| U.S. Pat. No. 9,339,612 | Freeman et al. |
| U.S. Pat. No. 9,402,956 B2 | Mears et al. |
| U.S. Pat. No. 9,439,591 | Frey et al. |
| U.S. Pat. No. 9,645,105 B2 | Simmons et al. |
| U.S. Pat. No. 9,795,747 | Castle et al. |
| U.S. Pat. No. 11,668,707 | Siemens Healthcare Diagnostics Inc. |
| U.S. Pat. No. 11,125,738 | Thermo Finnigan LLC |
| U.S. Pat. No. 10,324,028 | TOHOKU UNIVERSITY |
| U.S. Pat. No. 10,241,034 | TOHOKU UNIVERSITY |
| U.S. Pat. No. 9,647,289 | Dighton et al. |

| US patent PUBLICATIONS | |
|---|---|
| Pat. No. | Patentee |
| US20130171675 A1 | Tsukamoto et al. |
| US20210330228 A1 | Olsen et al. |
| US20170000349 A1 | Krief et al. |
| US20070088377 A1 | LeVAUGHN et al. |
| US20110282173 A1 | Fonduca et al. |
| US20140364711 A1 | Ismail et al. |
| US20170045468 A1 | Simmons et al. |
| US20200141920 | Thermo Finnigan LLC |
| US20170254746 | TOHOKU UNIVERSITY |
| US20200080994 | Siemens Healthcare Diagnostics Inc. |
| US20170254743 | TOHOKU UNIVERSITY |

| NON patent LITERATURE |
| --- |
| U.S. Provisional patent application No. 63/394,416 filed 2 Aug. 2022. First named inventor: Norton.<br>MedicalNewsToday, Lancets: 5 to consider in 2023. https://www.medicalnewstoday.com/articles/best-lancets#top-lancets. Retrieved Apr. 24, 2023. 25 pages. |

Thus, the applicant(s) should be understood to have support to claim and make claims to embodiments including at least: i) each of the biological test devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein. In addition and as to computer aspects and each aspect amenable to programming or other electronic automation, it should be understood that in characterizing these and all other aspects of the various embodiments of the invention(s)—whether characterized as a device, a capability, an element, or otherwise, because all of these can be implemented via software, hardware, or even firmware structures as set up for a general purpose computer, a programmed chip or chipset, an ASIC, application specific controller, subroutine, logic, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines, processor logic, and/or programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123 (2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrases "comprising", "including", "containing", "characterized by" and "having" are used to maintain the "open-end" claims herein, according to traditional claim interpretation including that discussed in MPEP § 2111.03. Thus, unless the context requires otherwise, it should be understood that the terms "comprise" or variations such as "comprises" or "comprising", "include" or variations such as "includes" or "including", "contain" or variations such as "contains" and "containing", "characterized by" or variations such as "characterizing by", "have" or variations such as "has" or "having", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 9 or any other claim" or the like, it could be re-drafted as dependent on claim 1, claim 8, or even claim 11 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

With respect to the drawings, it should be understood that these present only initial views, mirror views such as left, right, top, bottom, front, and back should be understood as within the realm of this disclosure as may be appropriate for design or industrial design protections. Furthermore, any aspect and any portion of such drawings should be understood as potentially not within the scope of any then-made claim such as by then dashing any portion desired. And such drawings should be understood as including drawing elements such as rectangles, circles, ellipses, ovals, squares, and the like as particular side or other views as well understood from the existing drawings.

Finally, any claims set forth at any time are hereby incorporated by reference as part of this description of the various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A user-friendly personal biological test system comprising:
   a single, multiple differential biological test receptacle having a biological element presence sensor configured to detect a presence of a smart cartridge;
   a removable, electronically activable, continuous pocket shaped exterior form factor creating, user interchangeable, biological blood test-based multiple glucose test event features smart cartridge having a modifiable memory and configured to mate with and communicate information from said modifiable memory through said single, multiple differential biological test receptacle;
   a removable, electronically activable, continuous pocket shaped exterior form factor creating, user interchangeable, biological blood test-based multiple A1C test event features smart cartridge having a modifiable memory and configured to mate with and communicate information from said modifiable memory through said single, multiple differential biological test receptacle;
   a single, biological sampler receptacle having a biological element presence sensor configured to recognize the presence of a smart cartridge;
   a continuous pocket shaped exterior form factor creating, removable biological multiple blood sampler event features smart cartridge having a modifiable memory and configured to mate with and communicate information from said modifiable memory through said single biological sampler receptacle;
   an automatically reconfigurable, substantially instantaneous analysis, multi-differential biological test processor that is automatically reconfigured in response to at least one of said biological element presence sensors and that operates responsive to at least one of said biological element presence sensors;
   a user test output responsive to said automatically reconfigurable, substantially instantaneous analysis, multi-differential biological test processor; and
   a fully contained, pocket-transportable, user biological test form factor configured to house said automatically reconfigurable, substantially instantaneous analysis, multi-differential biological test processor, said single multiple differential biological test receptacle, said single biological sampler receptacle, said user test output, said continuous pocket shaped exterior form factor creating, removable biological multiple blood sampler event features smart cartridge, and alternatively one of said removable, electronically activable, continuous pocket shaped exterior form factor creating, user interchangeable, biological blood test-based multiple glucose test event features cartridge or said removable, electronically activable, continuous pocket shaped exterior form factor creating, user interchangeable, biological blood test-based multiple A1C test event features cartridge.

2. A user-friendly personal biological test system as described in claim 1 wherein said removable, electronically activable, continuous pocket shaped exterior form factor creating, user interchangeable, biological blood test-based multiple glucose test event features smart cartridge, said removable, electronically activable, continuous pocket shaped exterior form factor creating, user interchangeable, biological blood test-based multiple A1C test event features smart cartridge, and said continuous pocket shaped exterior form factor creating, removable biological multiple blood sampler event features smart cartridge each comprise a smart biological blood test-based element chosen from at least one of:
- a modifiable memory capable biological blood test-based element configured to store and modify biological blood test-based element use related information,
- a communication capable biological blood test-based element configured to react to a modifiable memory and to communicate changeable use related information,
- a biological element multiple common feature information containing biological blood test-based element,
- a biological element expiration information containing biological blood test-based element,
- a biological element number of uses information containing biological blood test-based element,
- a biological element number of multiple common features information containing biological blood test-based element,
- a biological element recency of use information containing biological blood test-based element,
- a biological element time of use information containing biological blood test-based element, and
- a biological element time since last use information containing biological blood test -based element.

3. A user-friendly personal biological test system as described in claim 2 wherein said removable, electronically activable, continuous pocket shaped exterior form factor creating, user interchangeable, biological blood test-based multiple glucose test event features smart cartridge, said removable, electronically activable, continuous pocket shaped exterior form factor creating, user interchangeable, biological blood test-based multiple A1C test event features smart cartridge, and said continuous pocket shaped exterior form factor creating, removable biological multiple blood sampler event features smart cartridge each comprise an electro-mechanically sequenced biological blood test -based cartridge.

4. A user-friendly personal biological test system as described in claim 3 wherein said continuous pocket shaped exterior form factor creating, removable biological multiple blood sampler event features smart cartridge comprises a plurality of deterministically reusable common event features that are efficacy analyzed prior to such reuse.

5. A user-friendly personal biological test system as described in claim 1 wherein said automatically reconfigurable, substantially instantaneous analysis, multi-differential biological test processor comprises a pre-stored software routine selectable multi -differential biological test processor.

6. A user-friendly personal biological test system as described in claim 1 wherein said automatically reconfigurable, substantially instantaneous analysis, multi-differential biological test processor comprises an automatic sensor-deterministically configured multi-differential biological test processor.

7. A user-friendly personal biological test system as described in claim 1 wherein a first exterior part of said fully contained, pocket-transportable, user biological test form factor comprises a first removable cartridge surface, and wherein a second exterior part of said fully contained, pocket-transportable, user biological test form factor comprises a second removable cartridge surface.

8. A user-friendly personal biological test system as described in claim 7 wherein said fully contained, pocket-transportable, user biological test form factor comprises a smart phone shaped fully contained, pocket-transportable, user biological test form factor.

9. A user-friendly personal biological test system as described in claim 1 and further comprising:
- a user sampler configuration selector capable of inputting a user sampling selection;
- a sampler selection efficacy analyzer to which said automatically reconfigurable, substantially instantaneous analysis, multi-differential biological test processor is responsive, and configured to automatically disable operation of said continuous pocket shaped exterior form factor creating, removable biological multiple blood sampler event features smart cartridge when said user sampling selection is determined to be unacceptable.

10. A user-friendly personal biological test system as described in claim 9 wherein said automatically reconfigurable, substantially instantaneous analysis, multi-differential biological test processor comprises a computationally decisionally-based user programmable movement element.

11. A user-friendly personal biological test system as described in claim 10 wherein said user sampler configuration selector comprises a user reconfigurable common feature repetition selector.

12. A user-friendly personal biological test system as described in claim 10 and further comprising: a test safety disable element; and a user reselection prompt.

13. A user-friendly personal biological test system comprising:
- an automatically reconfigurable, substantially instantaneous analysis, multi-differential biological test processor;
- a first biological action receptacle to which said substantially instantaneous analysis biological test processor is responsive;
- a removable, form factor contained, electro-mechanical multiple test device features particular biological test type smart cartridge having a modifiable biological test cartridge memory and configured to mate with and communicate test type information electronically from said smart cartridge through said first biological action receptacle;
- a second biological action receptacle to which said substantially instantaneous analysis biological test processor is responsive;
- a removable, form factor contained, electro-mechanical multiple test device features biological sampler smart cartridge having a modifiable biological sampler cartridge memory and configured to mate with and communicate information from said modifiable biological sampler cartridge memory through said second biological action receptacle;
- a user test output responsive to said substantially instantaneous analysis biological test processor; and
- a fully contained, pocket-transportable, user biological test form factor configured to house said automatically reconfigurable, substantially instantaneous analysis, multi -differential biological test processor, said first biological action receptacle, said removable, form factor contained, electro-mechanical multiple test device features particular biological test type smart cartridge, said second biological action receptacle, said removable, form factor contained, electro-mechanical multiple test device features biological sampler smart cartridge, and said user test output within said fully contained, pocket-transportable, user biological test form factor,
- wherein said automatically reconfigurable, substantially instantaneous analysis, multi -differential biological test processor is automatically configured to perform an appropriate biological test type from a plurality of completely different types of biological tests in response to the communication of test type information of said removable, form factor contained, electro-mechanical multiple test device features particular biological test type smart cartridge, and wherein a first exterior part of said fully contained, pocket-transportable, user biological test form factor comprises a first removable cartridge surface, and wherein a second exterior part of said fully contained, pocket-transportable, user biological test form factor comprises a second removable cartridge surface.

14. A user-friendly personal biological test system as described in claim 13 wherein said removable, form factor contained, electro-mechanical multiple test device features particular biological test type smart cartridge, or said removable, form factor contained, electro-mechanical multiple test device features biological sampler smart cartridge, comprise a smart biological blood test-based element chosen from at least one of:
a modifiable memory capable biological blood test-based element configured to store and modify biological blood test-based element use related information,
a communication capable biological blood test-based element configured to react to a modifiable memory and to communicate changeable use related information,
a biological element multiple common features information containing biological blood test-based element,
a biological element expiration information containing biological blood test -based element,
a biological element number of uses information containing biological blood test-based element,
a biological element number of multiple common features information containing biological blood test-based element,
a biological element recency of use information containing biological blood test -based element,
a biological element time of use information containing biological blood test -based element, and
a biological element time since last use information containing biological blood test-based element.

15. A user-friendly personal biological test system as described in claim 13 wherein said removable, form factor contained, electro-mechanical multiple test device features biological sampler smart cartridge comprises a plurality of deterministically reusable common event features.

16. A user-friendly personal biological test system as described in claim 15 wherein said plurality of deterministically reusable common event features comprises at least one reusable lancet.

17. A user-friendly personal biological test system as described in claim 16 wherein said removable, form factor contained, electro-mechanical multiple test device features biological sampler smart cartridge comprises a second removable, form factor contained, electro-mechanically controlled multiple biological sampler test device features smart cartridge having a modifiable biological sampler cartridge memory, and wherein said modifiable biological sampler cartridge memory is configured to store information related to said at least one reusable lancet.

18. A user-friendly personal biological test system as described in claim 17 wherein reuse of said reusable lancet is efficacy analyzed prior to such reuse.

19. A user-friendly personal biological test system as described in claim 13 and further comprising a biological test element information sensor configured to detect information indicative of an appropriate test type for said removable, form factor contained, electro-mechanical multiple test device features particular biological test type smart cartridge.

20. A user-friendly personal biological test system as described in claim 19 and further comprising a biological sample element information sensor configured to detect information from said removable, form factor contained, electro-mechanical multiple test device features biological sampler smart cartridge.

21. A user-friendly personal biological test system as described in claim 13 wherein said removable, form factor contained, electro-mechanical multiple test device features particular biological test type smart cartridge has a modifiable biological test cartridge memory configured to communicate through said first biological action receptacle.

22. A user-friendly personal biological test system as described in claim 19 wherein said biological element information sensor comprises a device -contained different sense modality need subroutine.

23. A user-friendly personal biological test system as described in claim 19 wherein said biological element information sensor comprises a biological element test type sensor.

24. A user-friendly personal biological test system as described in claim 13 wherein said removable, form factor contained, electro-mechanical multiple test device features particular biological test type smart cartridge comprises an electro -mechanically sequenced biological blood test-based cartridge.

25. A user-friendly personal biological test system as described in claim 13 wherein said automatically reconfigurable, substantially instantaneous analysis, multi-differential biological test processor comprises a pre-stored software routine selectable multi-differential biological test processor.

26. A user-friendly personal biological test system as described in claim 13 wherein said automatically reconfigurable, substantially instantaneous analysis, multi-differential biological test processor comprises an automatic sensor-deterministically configured multi-differential biological test processor.

27. A user-friendly personal biological test system as described in claim 26 wherein said automatic sensor-deterministically configured multi-differential biological test processor comprises a cartridge presence sensor-deterministically configured multi -differential biological test processor.

28. A user-friendly personal biological test system as described in claim 20 wherein said automatically reconfigurable, substantially instantaneous analysis, multi-differential biological test processor comprises a reconfigurable multi -differential biological test processor configured to be automatically reconfigurationally responsive to said biological element information sensor.

* * * * *